United States Patent
Ye et al.

(10) Patent No.: US 10,162,810 B2
(45) Date of Patent: Dec. 25, 2018

(54) ADDRESS INFORMATION INPUT METHOD, ACQUISITION METHOD, APPARATUS, DEVICE, AND SYSTEM

(71) Applicant: Tencent Technology (Shenzhen) Company Limited, Shenzhen (CN)

(72) Inventors: Wa Ye, Shenzhen (CN); Zhenyu Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 861 days.

(21) Appl. No.: 14/491,417

(22) Filed: Sep. 19, 2014

(65) Prior Publication Data

US 2015/0089346 A1 Mar. 26, 2015

Related U.S. Application Data

(63) Continuation of application No. PCT/CN2014/078386, filed on May 26, 2014.

(30) Foreign Application Priority Data

Sep. 24, 2013 (CN) .......................... 2013 1 0438146

(51) Int. Cl.
*G06F 17/00* (2006.01)
*G06F 17/24* (2006.01)
(Continued)

(52) U.S. Cl.
CPC ...... *G06F 17/243* (2013.01); *G06F 17/30401* (2013.01); *H04L 67/02* (2013.01);
(Continued)

(58) Field of Classification Search
CPC .............................. H04W 64/006; H04W 4/02
See application file for complete search history.

(56) References Cited

U.S. PATENT DOCUMENTS

| 7,076,505 B2 * | 7/2006 | Campbell | ............ | G01C 21/367 340/990 |
| 8,369,311 B1 * | 2/2013 | Kirchhoff | ......... | H04M 3/42263 370/352 |

(Continued)

FOREIGN PATENT DOCUMENTS

| CN | 102360461 A | 2/2012 |
| CN | 103051703 A | 4/2013 |

(Continued)

OTHER PUBLICATIONS

International Search Report and Written Opinion dated Sep. 3, 2014 for International Application No. PCT/CN2014/078386, 11 pages.

*Primary Examiner* — Mohammed H Zuberi
(74) *Attorney, Agent, or Firm* — Brinks Gilson & Lione

(57) ABSTRACT

Methods and devices are provided for inputting address information in the field of network technologies. The method includes: sending an address acquisition request to a server when an address needs to be input in a target page; receiving address information sent by the server, where the server receives the address acquisition request, acquires a geographical position of a terminal according to the address acquisition request, and determines the address information corresponding to the geographical position according to an address database; and inputting automatically the address information in an address input area of the target page.

14 Claims, 14 Drawing Sheets

(51) Int. Cl.
*G06F 17/30* (2006.01)
*H04W 4/02* (2018.01)
*H04W 4/04* (2009.01)
*H04L 29/08* (2006.01)

(52) U.S. Cl.
CPC ............... *H04L 67/18* (2013.01); *H04W 4/02* (2013.01); *H04W 4/04* (2013.01)

(56) References Cited

U.S. PATENT DOCUMENTS

| | | | | |
|---|---|---|---|---|
| 8,738,449 | B1* | 5/2014 | Cupps | G06Q 10/08 |
| | | | | 705/15 |
| 9,842,120 | B1* | 12/2017 | Siris | G06F 17/30241 |
| 9,876,761 | B2* | 1/2018 | Sadovsky | H04L 43/04 |
| 2005/0014482 | A1* | 1/2005 | Holland | G01S 5/0027 |
| | | | | 455/404.1 |
| 2005/0020241 | A1* | 1/2005 | Holland | G01S 5/0027 |
| | | | | 455/404.1 |
| 2005/0144249 | A1* | 6/2005 | Alex | H04M 3/42136 |
| | | | | 709/212 |
| 2010/0094536 | A1* | 4/2010 | Lee | G01C 21/3611 |
| | | | | 701/533 |
| 2011/0022299 | A1 | 1/2011 | Feng et al. | |
| 2012/0309424 | A1 | 12/2012 | Xiao et al. | |
| 2013/0297523 | A1* | 11/2013 | Karr | G06Q 10/083 |
| | | | | 705/330 |
| 2014/0164280 | A1* | 6/2014 | Stepanenko | G06Q 30/0601 |
| | | | | 705/341 |
| 2015/0281238 | A1* | 10/2015 | Ramachandran | G06F 21/51 |
| | | | | 726/4 |

FOREIGN PATENT DOCUMENTS

| | | |
|---|---|---|
| CN | 103123628 A | 5/2013 |
| CN | 103297551 A | 9/2013 |
| CN | 103475700 A | 12/2013 |
| JP | 2009-181588 A | 8/2009 |
| TW | 200729058 A | 8/2007 |
| TW | 201128554 A | 8/2011 |

* cited by examiner

ADDRESS INFORMATION INPUT METHOD, ACQUISITION METHOD, APPARATUS, DEVICE, AND SYSTEM

CROSS-REFERENCE TO RELATED APPLICATIONS

This application is a continuation of International Application No. PCT/CN2014/078386, filed on May 26, 2014, which claims priority to Chinese Patent Application No. 201310438146.X, filed on Sep. 24, 2013, which is hereby incorporated herein by reference in its entirety.

FIELD

The present disclosure relates to the field of network technologies, and more particularly to an address information input method, acquisition method, apparatus, device and system.

BACKGROUND

With the development of network technologies, online shopping becomes an important approach for people to purchase commodities. When purchasing a commodity on the Internet, a user needs to provide a vendor with a shipping address, so that the vendor is able to mail the commodity according to the shipping address provided by the user.

At present, when a user provides a vendor with a shipping address, an address information input method commonly used by a terminal includes the following steps. First, the terminal provides the user with an address information input box in a webpage. Second, the terminal receives a postcode, province/city/district, street address and specific door number input by the user in the address information input box. Third, the terminal sends the received address information to the seller, so that the seller acquires the address information and mails the commodity selected by the user to the corresponding address.

During the process of implementing the present disclosure, because a user needs to manually input information about a postcode, province/city/district, street address and door number, the efficiency of acquiring address information by a terminal is low. Especially when the terminal is a mobile terminal having a small screen and lacking an effective input peripheral, such as a mobile phone or IPAD, due to the limitations of the terminal screen and input peripheral, the efficiency of the user to input the information is quite low, that is, the efficiency of the terminal to acquire address information is quite low.

SUMMARY

To solve the problem that the efficiency of a terminal to acquire address information is quite low in the conventional method, embodiments of the present disclosure provide an address information input method, acquisition method and device.

A first aspect provides an address information input method, and the method includes: sending an address acquisition request to a server when an address needs to be input in a target page; receiving address information sent by the server, where the server receives the address acquisition request, acquires a geographical position of a terminal according to the address acquisition request, and determines the address information corresponding to the geographical position according to an address database; and inputting automatically the address information in an address input area of the target page.

A second aspect provides an address information acquisition method, and the method includes: receiving an address acquisition request sent by a terminal, where the address acquisition request includes a request sent by the terminal to input an address needs a target page; acquiring geographical position of the terminal according to the address acquisition request; determining address information corresponding to the geographical position according to an address database; and sending the determined address information to the terminal, and inputting automatically the address information in an address input area of the target page.

A third aspect provides an address input apparatus, and the apparatus includes: a first sending module, programmed to send an address acquisition request to a server in a jump to a target page where an address needs to be input; an address receiving module, programmed to receive address information sent by the server, where the server receives the address acquisition request, acquires a geographical position of a terminal according to the address acquisition request, and determines the address information corresponding to the geographical position according to an address database; and an address input module, programmed to input automatically the address information received by the address receiving module in an address input area of the target page.

A fourth aspect provides an address acquisition apparatus, and the apparatus includes: a first receiving module, programmed to receive an address acquisition request sent by a terminal, where the address acquisition request includes a request to input an address in a target page; a position acquisition module, programmed to acquire a geographical position of the terminal according to the address acquisition request received by the first receiving module; an address determination module, programmed to determine address information corresponding to the geographical position acquired by the position acquisition module according to an address database; and an address sending module, programmed to send the address information determined by the address determination module to the terminal, and input automatically the address information in an address input area of the target page.

A fifth aspect provides a terminal, which includes the address information input apparatus in the third aspect.

A sixth aspect provides a server, which includes the address information acquisition apparatus in the fourth aspect.

A seventh aspect provides an address information input system, which includes the address information input apparatus in the third aspect and the address information acquisition apparatus in the fourth aspect.

An eighth aspect provides an address information input system, which includes the terminal in the fifth aspect and the server in the sixth aspect, where the terminal is connected to the server through a wired or wireless network.

The solutions provided by the embodiments of the present disclosure have the following beneficial effects:

An address acquisition request is sent to a server in a jump to a target page where an address needs to be input, and address information sent by the server is received, where the server receives the address acquisition request, acquires a geographical position of a terminal according to the address acquisition request, and determines the address information corresponding to the geographical position according to an address database, so that the received address information can be input automatically in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

BRIEF DESCRIPTION OF THE DRAWINGS

To illustrate the solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE DRAWINGS

Figure 1:
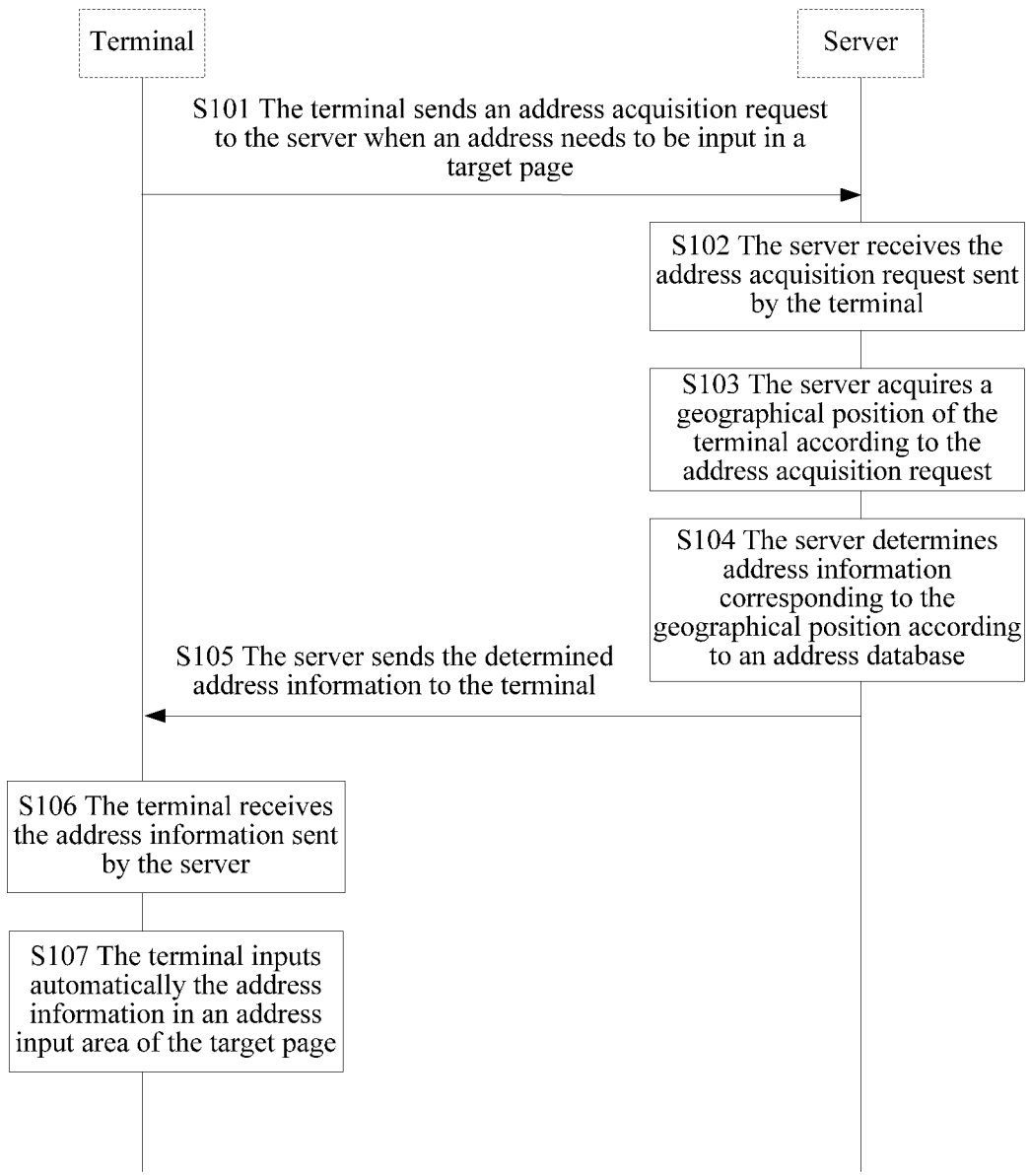
FIG. 1 is a method flowchart of an address information input method provided by an example embodiment of the present disclosure.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

A user, as used herein, may refer to one or more persons or things that control a client. The user may control more than one clients or other devices.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

In order to make the objectives, solutions, and advantages of the present disclosure more comprehensible, the present disclosure is described in further detail below with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Referring to FIG. 1, FIG. 1 is a method flowchart of an address information input method provided by an example embodiment of the present disclosure, and the address information input method may include:

Step 101. A terminal sends an address acquisition request to a server in a jump to a target page where an address needs to be input in the target page. The terminal may be any device that may be used to access the Internet. The target page may be a web page accessible to the terminal, a page in an application that runs in the terminal, or any information page shown on the terminal.

Step 102. The server receives the address acquisition request sent by the terminal The server may be connected to the terminal via Internet connection or other networks.

The address acquisition request includes a request sent by the terminal when the terminal opens a target page where an address needs to be input.

Step 103. The server acquires a geographical position of the terminal according to the address acquisition request.

Step 104. The server determines address information corresponding to the geographical position according to an address database.

Step 105. The server sends the determined address information to the terminal.

The address information is input automatically in an address input area of the target page.

Step 106. The terminal receives the address information sent by the server.

The server receives the address acquisition request, acquires the geographical position of the terminal according to the address acquisition request, and determines the address information corresponding to the geographical position according to the address database.

Step 107. The terminal inputs automatically the address information in the address input area of the target page.

In conclusion, in the address information input method provided by this embodiment, an address acquisition request is sent to a server when an address needs to be input in a target page, and address information sent by the server is received, where the server receives the address acquisition request, acquires a geographical position of a terminal according to the address acquisition request, and determines the address information corresponding to the geographical position according to an address database, so that the received address information can be input automatically in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

In Step 101, two implementation manners are provided. First, the terminal directly sends the address acquisition request including the geographical position to the server, so that the server can directly read the geographical position from the address acquisition request, so as to determine the address information corresponding to the geographical position and feeds back the determined address information to the terminal. Second, the terminal sends a trigger request for acquiring the address information to the server, so that the server receives the trigger request and positions the terminal to acquire the geographical position of the terminal, then determines the address information corresponding to the geographical position, and sends the determined address information to the terminal.

The foregoing two implementation manners are described below in detail in the following example embodiments.

Figure 2:
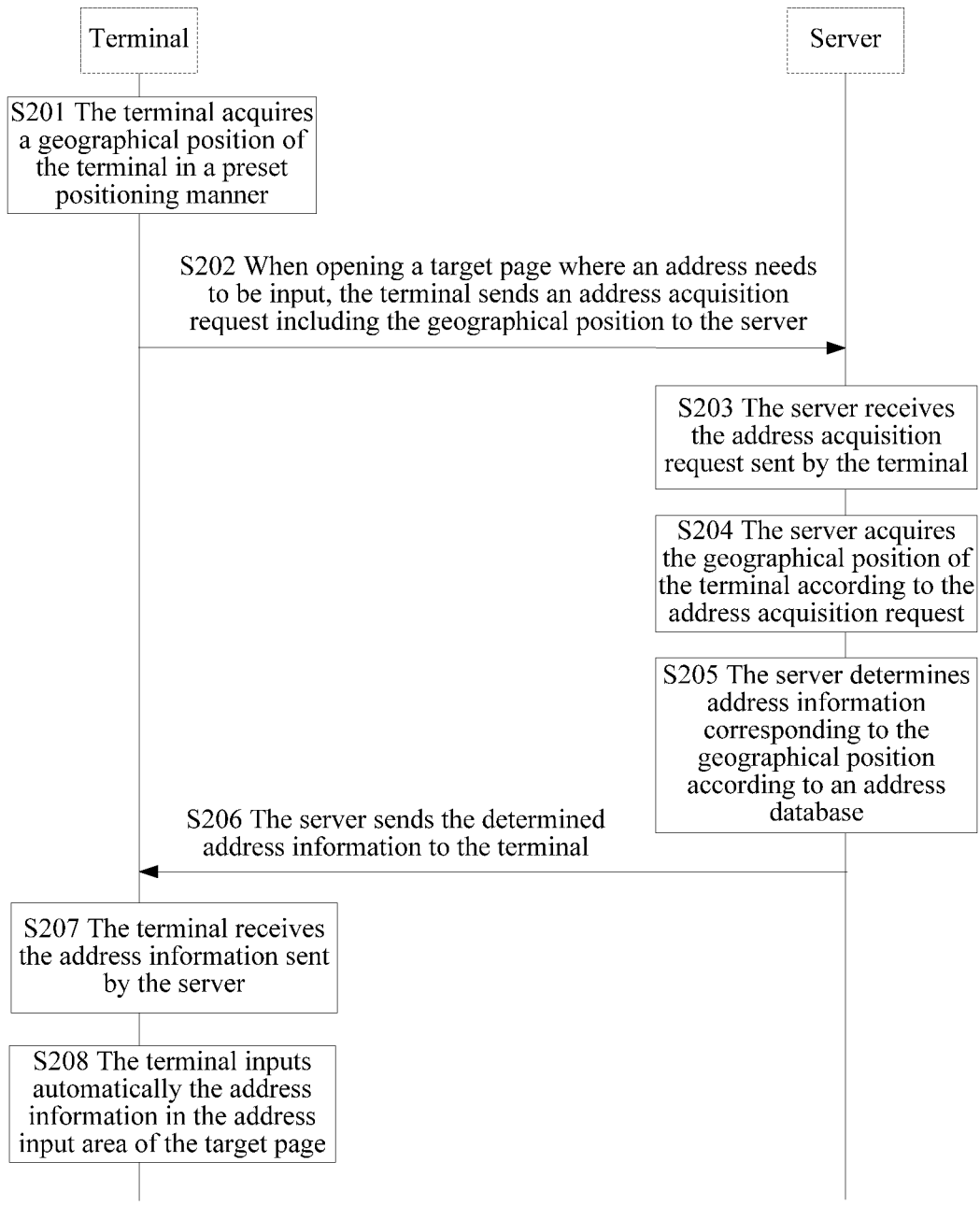
FIG. 2 is a method flowchart of an address information input method provided by an example embodiment of the present disclosure.

Referring to FIG. 2, FIG. 2 is a method flowchart of an address information input method provided by an example embodiment of the present disclosure. This embodiment uses an example in which a terminal sends an address acquisition request including a geographical position to a server as an example, and the address information input method may include:

Step 201. The terminal acquires the geographical position of the terminal in a preset positioning manner.

The terminal can acquire the geographical position of the terminal in a preset positioning manner. The geographical position may include the latitude and longitude of the terminal, and the preset positioning manner may be Global Positioning System (GPS) positioning or base station positioning.

For example, a navigation application 'XX map' is installed on a mobile phone. Therefore, the mobile phone can acquire a current geographical position of the mobile phone by means of the installed 'XX map', for example, the latitude and longitude of the acquired geographical position of the mobile phone are N31°32'31.18", E120°21'18.67", respectively.

It should be noted that, the terminal in this embodiment may be a mobile terminal such as a mobile phone, a tablet, an e-book reader, or any device having a processor programmed to implement the disclosed method.

Step 202. When opening a target page where an address needs to be input, the terminal sends the address acquisition request including the geographical position to the server.

When opening a target page where an address needs to be input, the terminal can send the address acquisition request including the geographical position to the server. A browser that the terminal uses when accessing the target page may be a built-in browser of an application on the terminal, and the server may be a server corresponding to an address input control of an application. When opening a target page where an address needs to be input, the terminal can invoke the address input control and then send the address acquisition request including the geographical position the server corresponding to the address input control.

A step that the terminal determines whether a page is a target page where an address needs to be input may include:

First, the terminal detects whether the domain name of a page after a jump is in a domain name database.

When a new page is opened, the terminal can detect whether the domain name of the page is in the domain name database. For example, the domain name database stores domain names A, B, C, and D. Therefore, when the terminal jumps to a page whose address is 'www.C.com', the terminal can detect whether the domain name of the page whose address is 'www.C.com' is one of A, B, C, and D.

Second, if a determination result is yes, determine that the page after the jump is a target page where an address needs to be input.

When a determination result of the terminal is that the domain name of the page after the jump is in the domain name database, the terminal can determine that the page after the current jump is a target page where an address needs to be input. When a determination result is that the domain name of the page after the jump is not in the domain name database, the terminal determines that the page after the current jump is not a target page where an address needs to be input, and the process ends, which is no longer elaborated in this embodiment.

For example, when Joe is chatting with a friend by using an instant communication application 'X message' on a mobile phone, the friend sends him a uniform resource locator (URL), and the URL corresponds to a purchase page about 'a computer of model XX'. When opening the webpage with a built-in browser of 'X message', Joe finds that this computer meets his demands and intends to buy it, Joe can first sign in his user account for online shopping and then clicks a Confirm to Buy button in the page, and accordingly the mobile phone jumps from the purchase page to an order confirmation page. When opening the order confirmation page, the mobile phone detects that the domain name of the page is in a domain name database and can determine that the page after the jump is a page where an address needs to be input, so that the mobile phone can invoke an address input control and send an address acquisition request including a geographical position of the mobile phone to a server corresponding to the control.

It should be noted that, Step 201 may be a step executed by the terminal in real time, and may also be a step of which the execution is triggered when the terminal jumps to a target page where an address needs to be input. In a practical implementation, this embodiment does not limit a specific time of executing the step, as long as this step is executed before the step that the terminal sends an address acquisition request to a server and the acquired geographical position is the current geographical position of the terminal.

Step 203. The server receives the address acquisition request including the geographical position sent by the terminal.

Correspondingly, the server can receive the address acquisition request including geographical position sent by the terminal.

Step 204. The server reads the geographical position in the address acquisition request.

After receiving the address acquisition request, the server can read the geographical position in the received address acquisition request.

Step 205. The server determines address information corresponding to the geographical position according to an address database.

The server can determine the address information corresponding to the geographical position according to a pre-stored address database. The address database may include a Point of Interest (POI) database. The database stores at least one pre-established POI, and each POI at least includes a name, a type, the longitude and latitude, and in a practical implementation, a POI may further include a postcode, a phone number, a province/city/district identifier, a street address, a door number, a nearby shop, a famous building, a hotel, and the like.

For example, a POI may have the name East Hotel, the type Company, the longitude N31°32'31.18", the latitude E120°21'18.67", the postcode 214028, the province/city/district identifier Binhu District, Wuxi City, Jiangsu Province, and the street address No. 5, Changjiang North Road. In a practical implementation, the province/city/district can use a specified identifier. For example, 'Su' represents Jiangsu Province, 'B' represents Wuxi City, and a specific identifier 'X' represents Binhu District. Definitely, further reference may be made to the representation method of the landline telephone area code. An area code is programmed to represent a province/city/district, and a specific identifier represents an area, the specific implementation forms of which are not limited in this embodiment, and one type of POI database in this embodiment may be shown in Table 1:

TABLE 1

| Area Code | Specific Area of City | Street Address | Name | Type | Longitude | Latitude |
| --- | --- | --- | --- | --- | --- | --- |
| 0510 | Binhu District | No. 1800 Lihu Road | XX University | School | N31°29'4.01" | E120°16'22.98" |
| 0510 | Binhu District | No. 5 Changjiang North Road | East Hotel | Company | N31°32'31.18" | E120°21'18.67" |
| 0510 | Binhu District | No. 15 Qingqi Road | Glamorous City | Residence | N31°30'25.85" | E120°16'29.08" |
| 0510 | Chong'an District | No. 128, Zhongshan Road | Xingfu Garden | Residence | N31°34'38.69" | E120°17'42.40" |

TABLE 1-continued

| Area Code | Specific Area of City | Street Address | Name | Type | Longitude | Latitude |
|---|---|---|---|---|---|---|
| 021 | Jiading District | No. 123, Yingyuan Road | First Junior High School | School | N31°22'48.32" | E121°15'41.28" |
| 021 | Pudong New District | No. 52, Jinsong Road | Huali Garden | Residence | N31°13'29.55" | E121°33'10.54" |
| ... | | | | | | |

For example, the step that the server determines address information corresponding to the geographical position according to an address database may include:

First, select at least one piece of address information from the address database, where the distance between the position corresponding to each piece of address information in the at least one piece of address information and the geographical position is smaller than a preset threshold value.

The server can first select least one piece of address information from the address database. The distance between the position corresponding to each selected piece of address information in the at least one piece of address information and the geographical position is smaller than a preset threshold value.

For example, the preset threshold value is 3000 meters. The latitude and longitude of the geographical position are N31°32'31.18" and E120°21'18.67", respectively, so that the server can calculate a POI, whose distance away from the geographical position is smaller than 3000 meters, in the POI database.

It should be noted that, when finding through calculation that the address database does not include address information whose distance away from the geographical position is smaller than a preset threshold value, the server can feed back error information to the terminal, and the process ends, which is no longer elaborated in this embodiment.

Here, the preset threshold value in this embodiment may be a preset fixed value, or may also be a value selected from several preset values according to a different condition. For example, when the server detects that the geographical position corresponds to one public building such as a school, company or mall, because these sites may possibly share one address, the server can select a large value as the preset threshold value. When the geographical position corresponds to one residential area, because every family needs to use a different address, the server can select a small value as the preset threshold value, which is no longer elaborated in this embodiment.

Second, calculate a score of each selected piece of address information according to a preset score item.

After selecting at least one piece of address information, the server can calculate a score of each selected piece of address information according to a preset score item. The preset score item includes at least one of the distance between the position corresponding to the address information and the geographical position, the number of times that the address information is historically used, the type of the address information, and an information perfection degree of the address information. The type of the address information is a school, company, hospital, residence, park or mall.

For example, the step that the server calculates a score of each selected piece of address information according to a preset score item may include:

a. If the preset score item includes the distance between the position corresponding to the address information and the geographical position, calculate the distance between the position corresponding to each piece of address information and the geographical position according to the latitude and longitude of each piece of address information, and query for a first score corresponding to the calculated distance according to a first association relationship.

If the preset score item includes the distance between the position corresponding to the address information and the geographical position, the server can calculate the distance between the position corresponding to each piece of address information and the geographical position according to the latitude and longitude of each piece of address information. When the distance between the position corresponding to the address information and the geographical position is smaller, it indicates that the position corresponding to the address information better meets the position of the terminal, the possibility that the user selects the address information to use is higher, and correspondingly, the server should also give a higher score to the address information. Therefore, the server can query the first association relationship for a first score corresponding to the calculated distance, where the first association relationship is a negative correlation relationship between the first score and the distance between the position corresponding to the address information and the geographical position.

b. If the preset score item includes the number of times that the address information is historically used, calculate the number of times that each piece of address information is historically used, and query for a second score corresponding to the calculated number of times of historical use according to a second association relationship.

When the number of times that the address information is used by other users is larger, it indicates that the possibility that a user nearby the geographical position selects to use the address information is higher, and correspondingly, the server also should give a higher score to the address information. Therefore, when the preset score item includes the number of times that the address information is historically used, the server can calculate the number of times that each piece of address information is historically used, so as to query the second association relationship for a second score corresponding to the calculated number of times of historical use. The second association relationship is a positive correlation relationship between the number of times that the address information is historically used and the second score.

c. If the preset score item includes the type of the address information, query for a third score corresponding to the type of each piece of address information according to a third association relationship.

Some types of address information may be used synchronously by a plurality of users, and some types of address information can only be used by a specific user. For example, address information whose type is a company can be used synchronously by all employees of the company, address information whose type is a school can also be used synchronously by all teachers and students of the school, and address information whose type is a residence can only be used by residents in the address information and is very unlikely to be used by other users. Therefore, when the preset score item includes the type of the address information, the server can query the third association relationship for a third score corresponding to the type of each piece of address information. The third association relationship is a relationship between the type of the address information and the third score.

d. If the preset score item includes an information perfection degree of the address information, calculate an information perfection degree of each piece of address information, and query for a fourth score corresponding to the calculated information perfection degree according to a fourth association relationship.

When the information perfection degree of the address information is higher, it indicates that the use value of the address information is higher, and the possibility that the user selects to use the address information is higher. Therefore, the server also should give a higher score to the address information. Therefore, when the preset score item includes an information perfection degree of the address information, the server can calculate an information perfection degree of each piece of address information, and query the fourth association relationship for a fourth score corresponding to the calculated information perfection degree. The fourth association relationship is a positive correlation relationship between the information perfection degree of the address information and the fourth score.

e. Calculate the score of each piece of address information according to the score of each preset score item and a weight corresponding to each preset score item.

After calculating the score of each preset score item of each address information, the server can calculate the score of each piece of address information according to the score of each preset score item and a weight corresponding to each preset score item.

For example, the preset score item includes the four score items at the same time, and the server calculates that the scores of the preset score items of a piece of address information are 8, 9, 5, and 4, respectively, and the weights corresponding to the preset score items are 0.2, 0.5, 0.1, and 0.2, so that the server can calculate that the score of the address information is 8*0.2+9*0.5+5*0.1+4*0.2=7.4.

Third, use address information of n highest scores as the address information corresponding to the geographical position, where n is a positive integer.

After calculating a score of each selected piece of address information, the server can use the address information of n highest scores as the address information corresponding to the geographical position, where n is a positive integer.

Step 206. The server sends the determined address information to the terminal.

After determining the address information corresponding to the geographical position, the server can send the determined address information to the terminal, where the address information is input automatically in an address input area of the target page. Also, in a practical implementation, to recommend to the terminal address information that matches the geographical position the most and enhance the efficiency of the terminal to input address information, the server can send the determined address information to the terminal based on an order of scores of the address information.

Step 207. The terminal receives the address information sent by the server.

Correspondingly, the terminal receives the address information sent by the server. The server receives the address acquisition request, acquires the geographical position of the terminal according to the address acquisition request, and determines the address information corresponding to the geographical position according to the address database.

Step 208. The terminal inputs automatically the address information in the address input area of the target page.

After receiving the address information, the server inputs automatically the address information in the address input area of the target webpage.

Figure 3:
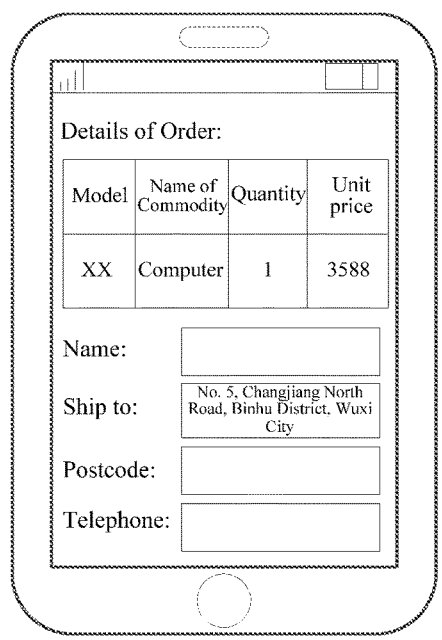
FIG. 3 is a schematic view of a terminal displaying received address information provided by an example embodiment of the present disclosure.

For example, when receiving address information 'No. 5, Changjiang North Road, Binhu District, Wuxi City', a mobile phone can input the address information in the address input area shown in FIG. 3.

It should be noted that because each address corresponds to one unique postcode, when the address information in the address database includes a postcode, the server can further send the postcode together to the terminal, so that the terminal can input automatically the postcode in a postcode input area, which is no longer elaborated in this embodiment.

Figure 4:
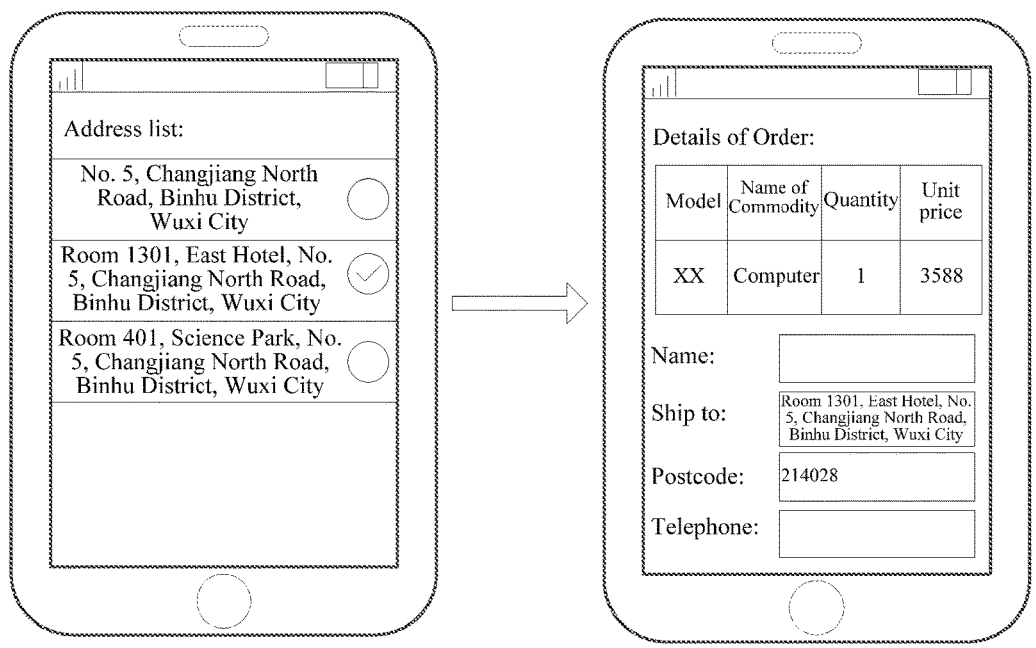
FIG. 4 is a schematic view of the terminal selecting one piece of address information provided by an example embodiment of the present disclosure.

It should also be noted that if the terminal receives two or more pieces of address information, after the server sends the determined address information to the terminal, the terminal displays the received address information in the form of a list. For example, referring to FIG. 4, to use an address that a user needs, before the terminal inputs automatically the address information in an address input area of the target page, the terminal can further execute the following steps:

First, the terminal receives a selection signal for selecting one piece of address information from two or more pieces of address information.

After the terminal displays the list of address information, the user can select one piece of address information from the list of address information through a selection button on the terminal or in the manner of clicking one piece of address information, so that the terminal can receive a selection signal for selecting one piece of address information from two or more pieces of address information.

Second, the terminal selects one piece of address information according to the selection signal.

After receiving the selection signal, the terminal selects one piece of address information according to the selection signal. For example, by using a touchscreen mobile phone as an example, the terminal receives a touch signal that acts on the address 'Room 1301, East Hotel, No. 5, Changjiang North Road, Binhu District, Wuxi City' shown in FIG. 4, so that the terminal can select the address 'Room 1301, East Hotel, No. 5, Changjiang North Road, Binhu District, Wuxi City'.

Correspondingly, the terminal can input automatically the selected address information in the address input area of the target page.

It should be noted that when the terminal receives two or more pieces of address information, the user can further use the first address information in the address information list as default address information through a system setting, so as to directly input the default address information in the address input area of the target page, which is no longer elaborated in this embodiment.

In conclusion, in the address information input method provided by this embodiment, an address acquisition request is sent to a server in a jump to a target page where an address needs to be input, and address information sent by the server is received, where the server receives the address acquisition request, acquires a geographical position of a terminal according to the address acquisition request, and determines the address information corresponding to the geographical position according to an address database, so that the received address information can be input automatically in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

Figure 5:
FIG. 5 is a method flowchart of an address information input method provided by an example embodiment of the present disclosure.

Referring to FIG. 5, FIG. 5 shows a method flowchart of an address information input method provided by an example embodiment of the present disclosure. This embodiment still uses an example in which a terminal sends an address acquisition request including a geographical position to a server, and this embodiment is different from the above example embodiment in that the terminal receives address information fed back the server and can modify the received address information, so as to input automatically the modified address information in an address input area of a target page. The address information input method may include:

Step 301. The terminal acquires the geographical position of the terminal in a preset positioning manner.

The terminal can acquire the geographical position of the terminal in a preset positioning manner. The geographical position includes the latitude and longitude of the terminal, and the preset positioning manner may be GPS positioning or base station positioning.

Step 302. The terminal sends the address acquisition request including the geographical position to the server.

When opening a target page where an address needs to be input, the terminal can send the address acquisition request including the geographical position to the server. A browser that the terminal uses when accessing the target page may be a built-in browser of an application on the terminal, and the server may be a server corresponding to an address input control of the application.

Step 303. The server receives the address acquisition request including the geographical position sent by the terminal.

Correspondingly, the server can receive the address acquisition request including the geographical position sent by the terminal.

Step 304. The server reads the geographical position in the address acquisition request.

After receiving the address acquisition request, the server can read the geographical position in the received address acquisition request.

Step 305. The server determines address information corresponding to the geographical position according to an address database.

The server can determine the address information corresponding to the geographical position according to a pre-stored address database. The address database may include a POI database, the database stores at least one pre-established POI, and each POI at least includes a name, type, longitude and latitude. In a practical implementation, a POI may further include a postcode, phone number, province/city/district identifier, street address, door number and a nearby shop, famous building, hotel, and the like.

For example, the step that the server determines address information corresponding to the geographical position according to an address database may include:

First, select at least one piece of address information from the address database, where the distance between the position corresponding to each piece of address information in the at least one piece of address information and the geographical position is smaller than a preset threshold value.

The server can first select at least one piece of address information from the address database. The distance between the position corresponding to each selected piece of address information in the at least one piece of address information and the geographical position is smaller than a preset threshold value.

It should be noted that, when finding through calculation that the address database does not include address information whose distance away from the geographical position is smaller than a preset threshold value, the server can feed back error information to the terminal, and the process ends, which is no longer elaborated in this embodiment.

Here, the preset threshold value in this embodiment may be a preset fixed value, or may also be a value selected from several preset values according to a different condition. For example, when the server detects that the geographical position corresponds to one public building such as a school, company or mall, because these sites may possibly share one address, the server can select a large value as the preset threshold value. When the geographical position corresponds to one residential area, because every family needs to use a different address, the server can select a small value as the preset threshold value, which is no longer elaborated in this embodiment.

Second, calculate a score of each selected piece of address information according to a preset score item. The preset score item includes at least one of the distance between the position corresponding to the address information and the geographical position, the number of times that the address information is historically used, the type of the address information, and an information perfection degree of the address information, and the type of the address information is a school, company, hospital, residence, park or mall.

After selecting at least one piece of address information, the server can calculate a score of each selected piece of address information according to a preset score item. The preset score item includes at least one of the distance between the position corresponding to the address information and the geographical position, the number of times that the address information is historically used, the type of the address information, and an information perfection degree of the address information, and the type of the address information is a school, company, hospital, residence, park or mall.

For example, the step that the server calculates a score of each selected piece of address information according to a preset score item may include:

a. If the preset score item includes the distance between the position corresponding to the address information and the geographical position, calculate the distance between the position corresponding to each piece of address information and the geographical position according to the latitude and longitude of each piece of address information, and query for a first score corresponding to the calculated distance according to a first association relationship. The first association relationship is a negative correlation relationship between the first score and the distance between the position corresponding to the address information and the geographical position.

b. If the preset score item includes the number of times that the address information is historically used, calculate the number of times that each piece of address information is historically used, and query for a second score corresponding to the calculated number of times of historical use according to a second association relationship. The second association relationship is a positive correlation relationship between the number of times that the address information is historically used and the second score.

c. If the preset score item includes the type of the address information, query for a third score corresponding to the type of each piece of address information according to a third association relationship. The third association relationship is a relationship between the type of the address information and the third score.

d. If the preset score item includes an information perfection degree of the address information, calculate an information perfection degree of each piece of address information, and query for a fourth score corresponding to the calculated information perfection degree according to a fourth association relationship. The fourth association relationship is a positive correlation relationship between the information perfection degree of the address information and the fourth score.

e. Calculate the score of each piece of address information according to the score of each preset score item and a weight corresponding to each preset score item.

Third, use address information of n highest scores as the address information corresponding to the geographical position, where n is a positive integer.

After calculating a score of each selected piece of address information, the server can use address information of n highest scores as the address information corresponding to the geographical position, where n is a positive integer.

Step 306. The server sends the determined address information to the terminal.

After determining the address information corresponding to the geographical position, the server can send the determined address information to the terminal, where the address information is input automatically in the address input area of the target page. Also, in a practical implementation, to recommend to the terminal address information that matches the geographical position the most and enhance the efficiency of the terminal to input address information, the server can send the determined address information to the terminal based on an order of scores of the address information.

Step 307. The terminal receives the address information sent by the server.

Correspondingly, the terminal receives the address information sent by the server, where the server receives the address acquisition request, acquires the geographical position of the terminal according to the address acquisition request, and determines the address information corresponding to the geographical position according to the address database.

It should be noted that, Step 301 to Step 307 are similar to Step 201 to Step 207 in the above example embodiment, and specific technical details may be referred to the above example embodiment, which are no longer elaborated in this embodiment.

Step 308. The terminal receives a selection signal for selecting one piece of address information from two or more pieces of address information.

When the terminal receives the two or more pieces of address information, the user can select one piece of address information from the two or more pieces, that is, the terminal can receive a selection signal for selecting one piece of address information from two or more pieces of address information input by the user.

Step 309. The terminal selects one piece of address information according to the selection signal.

After receiving the selection signal, the terminal can select one piece of address information according to the selection signal.

Step 310. The terminal inputs automatically the selected address information in the address input area of the target page.

The terminal inputs automatically the selected address information in the address input area of the target page.

Step 311. The terminal receives a modification operation for modifying the address information.

Because the address information input automatically by the terminal is possibly address information near the user or the address information is imperfect, after the terminal inputs automatically the selected address information in the address input area, the user can further modify the address input in the address input area to address information that the user really needs. Therefore, the terminal can receive a modification operation for modifying the address information.

For example, the address information input automatically by the terminal in the address input area is 'Room 1301, East Hotel, No. 5, Changjiang North Road, Binhu District, Wuxi City', and instead, address information that a user practically needs to use is 'Room 1502, East Hotel, No. 5, Changjiang North Road, Binhu District, Wuxi City', so that after inputting automatically the address information in the address input area, the terminal can receive the modification operation for modifying the address information.

Step 312. The terminal modifies the address information according to the modification operation.

After receiving the modification operation, the terminal can modify the address information according to the modification operation.

For example, after receiving the modification operation, the terminal can modify 'Room 1301, East Hotel, No. 5, Changjiang North Road, Binhu District, Wuxi City' input automatically in the address input area to 'Room 1502, East Hotel, No. 5, Changjiang North Road, Binhu District, Wuxi City'.

It should be noted that if the address information input automatically by the terminal is the address information that the user eventually needs, Step 311 and Step 312 can also be removed. For example, a user that uses a terminal is just a user of 'Room 1301, East Hotel, No. 5, Changjiang North Road, Binhu District, Wuxi City', that is, the address information is just the address information that the user needs, so that the server can directly execute Step 313 without having to execute Step 311 and Step 312, which is not limited in this embodiment.

Step 313. The terminal sends target address information to the server.

To execute subsequent steps, after obtaining the address information that is eventually needed, the terminal can send the target address information to the server, where the target address information is address information eventually input in the address input area. Also, in a practical implementation, when Step 311 and Step 312 do not exist, the target address information is the address information input automatically in the address input area, whereas when Step 311 and Step 312 exist, the target address information is the modified address information, which is not limited in this embodiment.

Step 314. The server receives the target address information sent by the terminal, and executes an update operation according to the received target address information.

Correspondingly, the server can receive the target address information sent by the terminal, and after receiving the target address information, execute an update operation according to the received target address information.

For example, the step that the server executes an update operation according to the received target address information may include at least one of the following manners:

In a first possible implementation manner, to enable the server to subsequently determine address information corresponding to a geographical position according to a use condition of address information historically used by each user, after receiving the target address information sent by the terminal, the server can use the received target address information to update the address information in the address database. For example, the step that the server updates the address database according to the received target address information may include:

First, the server determines whether the target address information exists in the address database.

After receiving the address information sent by the terminal, the server may first determine whether the target address information exists in the address database. For example, the address information received by the server is 'Room 1502, East Hotel, No. 5, Changjiang North Road, Binhu District, Wuxi City' modified by the terminal, the server can detect whether 'Room 1502, East Hotel, No. 5, Changjiang North Road, Binhu District, Wuxi City' exists in the address database.

Second, if a determination result is yes, add 1 to the number of times that the target address information is used.

If a determination result of the server is yes, it indicates that a user has already used the address information previously, and to obtain the accumulated number of times that the address information is used, the server can add 1 to the number of times that the target address information is used. For example, a member of Room 1502, East Hotel has used the target address information, so that the member can send the used address information to the server, that is, the address information is saved in the address database of the server. Therefore, the server can detect that the target address information exists in the address database, and the server can add 1 to the number of times that the target address information is used.

Third, if a determination result is no and the type of the target address information is a school, company or hospital, add the target address information in the address database.

When the type of the address information is a public site such as a school, company or hospital, these pieces of address information can be shared by a plurality of users. Therefore, when a determination result of the server is no and the type of the target address information is a school, company or hospital, to make it convenient for a subsequent user to directly obtain the address information, the server can add the target address information in the address database.

For example, the address 'Room 1502, East Hotel, No. 5, Changjiang North Road, Binhu District, Wuxi City' has not been used by other users, so that after the terminal sends the target address information to the server, the server detects that the address database does not include the address information, and because the type of the address information is a company, that is, the address information can be shared by all employees of a same company, the server can add the target address information in the address database.

It should be noted that, when the type of the address information is a private site such as a residence, the address information that every family needs to use is different, that is, these pieces of information are very unlikely to be used by other users subsequently. Therefore, to reduce the space occupied by the address database in the server and increase the space utilization of the server, the server is allowed not to add this type of address information in the address database. Definitely, in a practical implementation, when detecting that the address database does not include the target address information, the server adds the target address information in the address database rather than to consider the type of the address information, which is not limited in this embodiment.

In a second possible implementation manner, to make it convenient for a user to query for address information historically used by the user later or select one piece of address information from the historically used address information as the address information that the user needs to use, after receiving the target address information, the server can further update a personal database corresponding to a user account that the terminal uses when accessing the target page according to the received target address information, and the specific steps may include:

Store the target address information in a personal database corresponding to a user account that the terminal uses when accessing a target page, so that subsequently each terminal that uses the user account can query for the target address information historically used by the user account.

The server can store the target address information in a personal database corresponding to a user account that the terminal uses when accessing the target page. Therefore, the user can query for the historically used target address information at any time. Also, in a practical implementation, after updating the personal database, the server later receives an address acquisition request sent by a terminal where the user account is located; then when the server determines the address information corresponding to the geographical position of the terminal, the server can set a relatively high weight for each piece of address information in the personal database corresponding to the user account, so that the address information determined by the server meets the use habit of the user better, thereby enhancing the efficiency of the terminal to input address information.

Correspondingly, the server can further execute the following steps:

First, the server receives a query request sent by the terminal, where the query request is programmed to query for the target address information historically used by the user account used by the terminal.

The terminal can send the query request to the server, and correspondingly, the server can receive the query request sent by the terminal. The query request is programmed to query for the target address information historically used by the user account used by the terminal.

Second, the server queries the stored personal database corresponding to the user account for the target address information historically used by the user account.

After receiving the query request, the server can query for the target address information historically used by the user account in the stored personal database corresponding to the user account.

Third, the server feeds back the found target address information to the terminal, so that the terminal receives the target address information that is fed back.

The server feeds back the found target address information to the terminal Correspondingly, the terminal can receive the target address information fed back by the server. In a practical implementation, after receiving the target address information fed back by the server, the terminal can, in one aspect, enable the user to know which pieces of address information that the user has used, and in another aspect, select one piece of address information from the historically used target address information as the address information that needs to be used. This embodiment does not limit the use manner after the terminal has found the target address information.

Step 315. The terminal sets the address information as default address information corresponding to the user account that the terminal uses when accessing the target page.

To enable the user to use the address information used by the terminal the current time as the address information that the user needs to use every time later, the terminal can further set the address information as the default address information corresponding to the user account that the terminal uses when accessing the target page, so that when each terminal that uses the user account accesses another page having the same function as the target page, the terminal can directly input the default address information in an address input area of the other page. The default address information is directly input in an address input area of another target page in a subsequent jump to the other target page. The other page having the same function as the target page in this embodiment refers to an order confirmation page that the terminal jumps to when selecting shopping.

It should be further noted that Step 315 may be executed at any step after Step 312, and this embodiment only uses the execution at this time as an example, and the specific execution moment thereof is not limited.

In conclusion, in the address information input method provided by this embodiment, an address acquisition request is sent to a server in a jump to a target page where an address needs to be input, and address information sent by the server is received, where the server receives the address acquisition request, acquires a geographical position of a terminal according to the address acquisition request, and determines the address information corresponding to the geographical position according to an address database, so that the received address information can be input automatically in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

Figure 6:
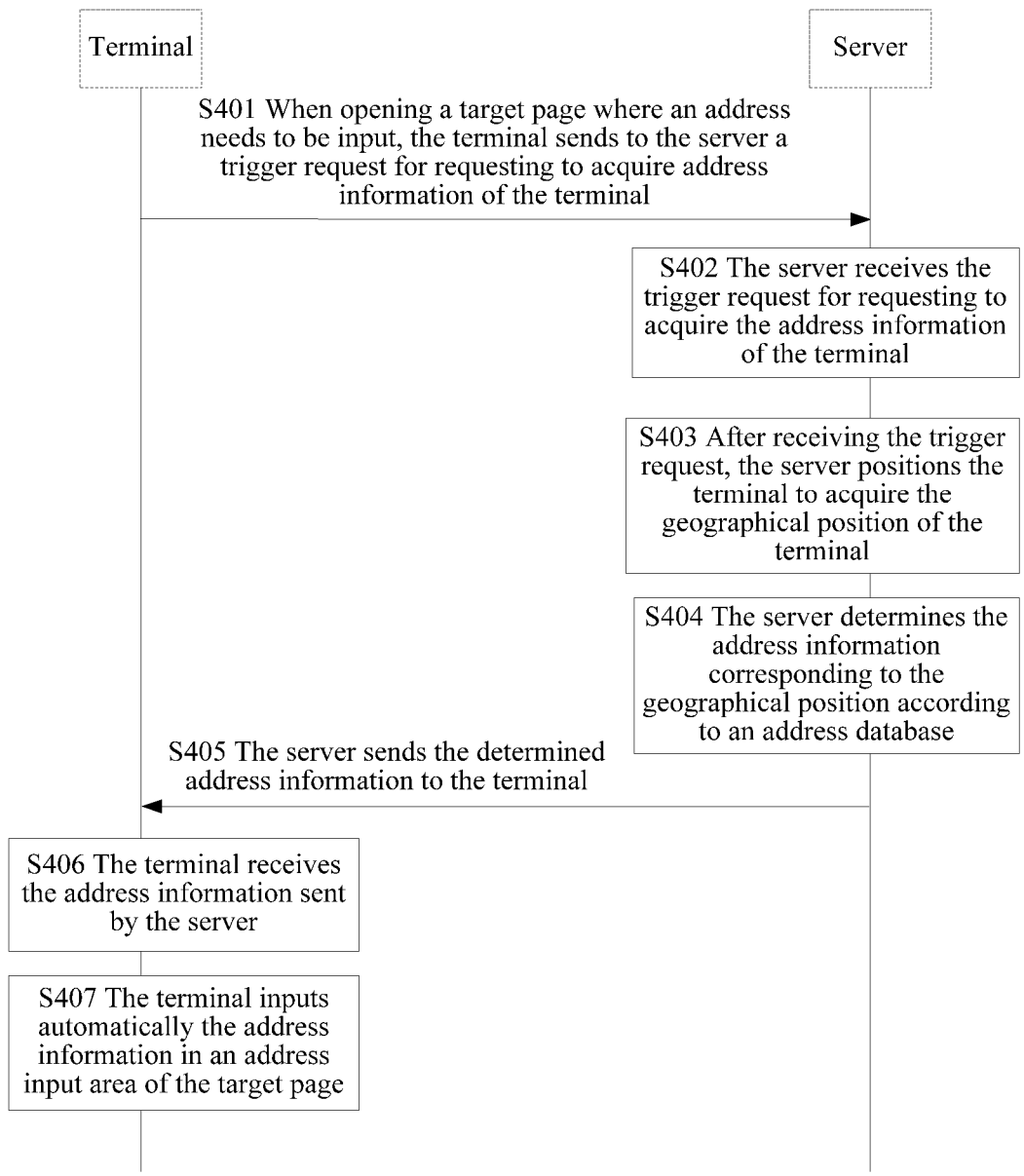
FIG. 6 is a method flowchart of an address information input method provided by an example embodiment of the present disclosure.

Referring to FIG. 6, FIG. 6 is a method flowchart of an address information input method provided by an example embodiment of the present disclosure. This embodiment is different from the above example embodiments in that, in this embodiment, a terminal does not acquire a geographical position of the terminal in advance. Instead, a terminal directly sends a trigger request to a server, and the server acquires a geographical position of the terminal according to the trigger request, and then determines address information corresponding to the geographical position. The address information input method may include:

Step 401. When opening a target page where an address needs to be input in the target page, the terminal sends to the server a trigger request for requesting to acquire address information of the terminal.

When opening a target page where an address needs to be input, the terminal can send to the server a trigger request for requesting to acquire the address information of the terminal.

A browser that the terminal uses when accessing the target page may be a built-in browser of an application on the terminal, and the server may be a server corresponding to an address input control of the application. The trigger request is programmed to trigger the server to position the terminal to acquire the geographical position of the terminal.

The step that the terminal determines whether a page is a target page where an address needs to be input may include:

First, the terminal detects whether the domain name of a page after a jump is in a domain name database.

When needing to jump to a new page, the terminal can detect whether the domain name of the page after the jump is in the domain name database.

Second, if a determination result is that the domain name is in the domain name database, determine that the page after the jump is a target page where an address needs to be input.

When a determination result of the terminal is that the domain name of the page after the jump is in the domain name database, the terminal can determine that the page after the current jump is a target page where an address needs to be input.

Step 402. The server receives the trigger request for requesting to acquire the address information of the terminal sent by the terminal.

Correspondingly, the server can receive the trigger request for requesting to acquire the address information of the terminal sent by the terminal.

Step 403. After receiving the trigger request, the server positions the terminal to acquire the geographical position of the terminal.

After receiving the trigger request, the server can position the terminal to acquire the geographical position of the terminal. The method that the server positions the terminal to acquire the geographical position of the terminal may be implemented by adopting an existing GPS positioning method, which is no longer elaborated in this embodiment.

Step 404. The server determines the address information corresponding to the geographical position according to an address database.

The server can determines the address information corresponding to the geographical position according to a pre-stored address database. The address database may be a POI database. The database stores at least one pre-established POI, and each POI at least includes a name, type, longitude and latitude. In a practical implementation, a POI may further include a postcode, phone, province/city/district identifier, street address, door number and a nearby shop, famous building, hotel, and the like.

For example, the step that the server determines the address information corresponding to the geographical position according to an address database may include:

First, select at least one piece of address information from the address database, where the distance between the position corresponding to each piece of address information in the at least one piece of address information and the geographical position is smaller than a preset threshold value.

The server can first select at least one piece of address information from the address database. The distance between the position corresponding to each selected piece of address information in the at least one piece of address information and the geographical position is smaller than a preset threshold value.

Second, calculate a score of each selected piece of address information according to a preset score item, where the preset score item includes at least one of the distance between the position corresponding to the address information and the geographical position, the number of times that the address information is historically used, the type of the address information, and an information perfection degree of the address information, and the type of the address information is a school, company, hospital, residence, park or mall.

After selecting the at least one piece of address information, the server can calculate a score of each selected piece of address information according to a preset score item, where the preset score item includes at least one of the distance between the position corresponding to the address information and the geographical position, the number of times that the address information is historically used, the type of the address information, and an information perfection degree of the address information, and the type of the address information is a school, company, hospital, residence, park or mall.

For example, the step that the server calculates a score of each selected piece of address information according to a preset score item may include:

a. If the preset score item includes the distance between the position corresponding to the address information and the geographical position, calculate the distance between the position corresponding to each piece of address information and the geographical position according to the latitude and longitude of each piece of address information, and query for a first score corresponding to the calculated distance according to a first association relationship, where the first association relationship is a negative correlation relationship between the first score and the distance between the position corresponding to the address information and the geographical position.

b. If the preset score item includes the number of times that the address information is historically used, calculate the number of times that each piece of address information is historically used, and query for a second score corresponding to the calculated number of times of historical use according to a second association relationship, where the second association relationship is a positive correlation relationship between the number of times that the address information is historically used and the second score.

c. If the preset score item includes the type of the address information, query for a third score corresponding to the type of each piece of address information according to a third association relationship, where the third association relationship is a relationship between the type of the address information and the third score.

d. If the preset score item includes an information perfection degree of the address information, calculate an information perfection degree of each piece of address information, and query for a fourth score corresponding to the calculated information perfection degree according to a fourth association relationship, where the fourth association relationship is a positive correlation relationship between the information perfection degree of the address information and the fourth score.

e. Calculate the score of each piece of address information according to the score of each preset score item and a weight corresponding to each preset score item.

Third, use address information of n highest scores as the address information corresponding to the geographical position, where n is a positive integer.

After calculating the score of each selected piece of address information, the server can use the address information of n highest scores as the address information corresponding to the geographical position, where n is a positive integer.

Step 405. The server sends the determined address information to the terminal.

After determining the address information corresponding to the geographical position, the server can send the determined address information to the terminal, where the address information is input automatically in an address input area of the target page. Also, in a practical implementation, to recommend to the terminal address information that matches the geographical position the most and enhance the efficiency of the terminal to input address information, the server can send the determined address information to the terminal based on an order of scores of the address information.

Step 406. The terminal receives the address information sent by the server.

Correspondingly, the terminal receives the address information sent by the server, where the server receives the address acquisition request, acquires the geographical position of the terminal according to the address acquisition request, and determines the address information corresponding to the geographical position according to the address database.

Step 407. The terminal inputs automatically the address information in the address input area of the target page.

It should be noted that Step 404 to Step 407 are similar to Step 205 to Step 208 in the above example embodiment, and more details may be referred to the aboe example embodiment, which are no longer elaborated in this embodiment.

It should be noted that if the terminal receives two or more pieces of address information, before inputting automatically the address information in the address input area of the target page, the terminal can further execute the following steps:

First, the terminal receives a selection signal for selecting one piece of address information from two or more pieces of address information.

Second, the terminal selects one piece of address information according to the selection signal.

Correspondingly, the terminal can input automatically the selected address information in the address input area of the target page.

Figure 7:
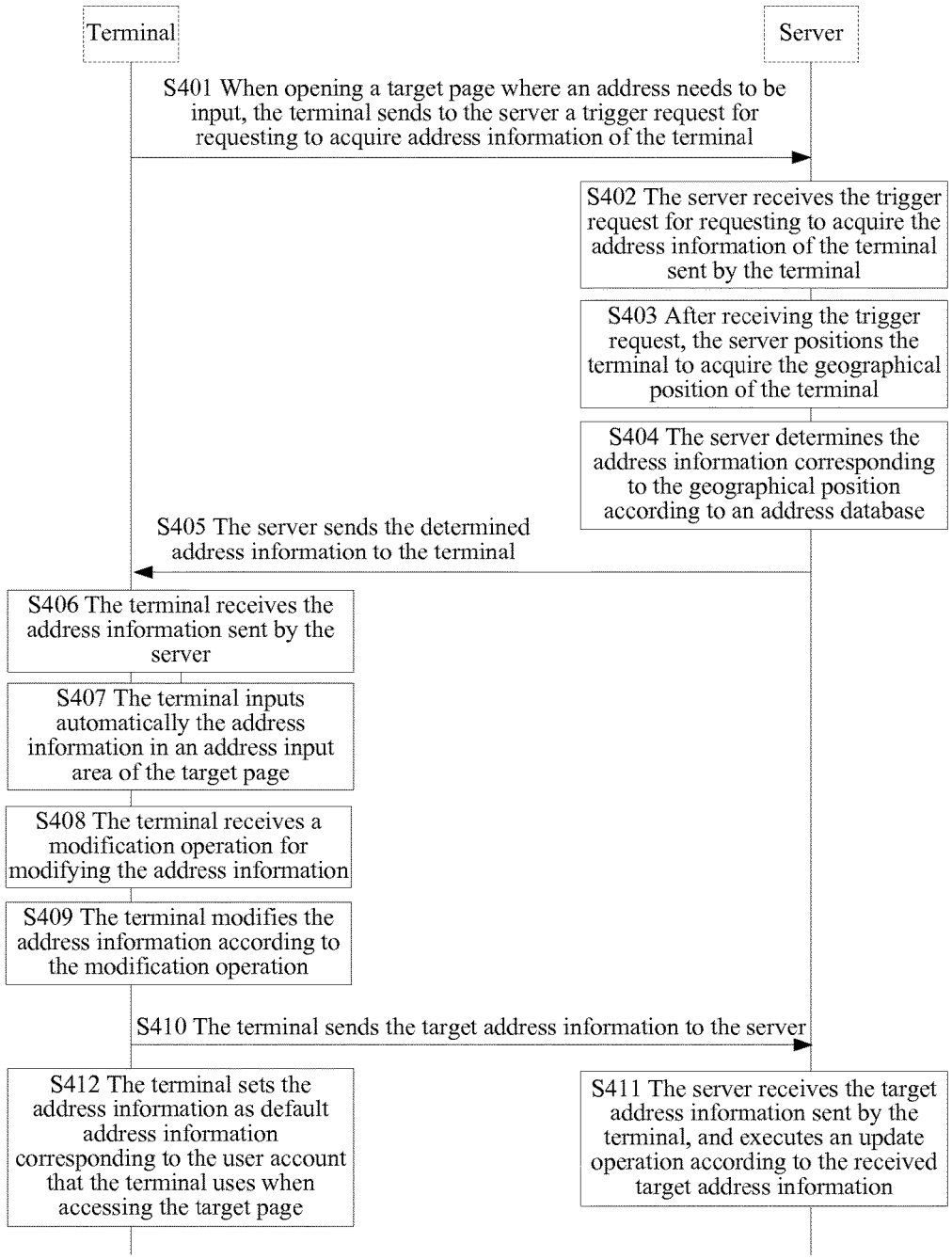
FIG. 7 is another method flowchart of the address information input method provided by an example embodiment of the present disclosure.

It should also be noted that, referring to FIG. 7, after inputting automatically the address information in the address input area of the target page, the terminal can further execute the following steps:

Step 408. The terminal receives a modification operation for modifying the address information.

Because the address information input automatically by the terminal is possibly address information near the user or the address information is imperfect, after the terminal inputs automatically the selected address information in the address input area, the user can further modify the address input in the address input area to address information that the user really needs. Therefore, the terminal can receive a modification operation for modifying the address information.

Step 409. The terminal modifies the address information according to the modification operation.

After receiving the modification operation, the terminal can modify the address information according to the modification operation.

Step 410. The terminal sends the target address information to the server.

To execute subsequent steps, after obtaining the address information that is eventually needed, the terminal can send the target address information to the server, where the target address information is address information eventually input in the address input area. Also, in a practical implementation, when Step 410 and Step 411 do not exist, the target address information is the address information input automatically in the address input area, whereas when Step 410 and Step 411 exist, the target address information is the modified address information, which is not limited in this embodiment.

Step 411. The server receives the target address information sent by the terminal, and executes an update operation according to the received target address information.

Correspondingly, the server can receive the target address information sent by the terminal, and after receiving the target address information, execute the update operation according to the received target address information.

The step that the server executes an update operation according to the received target address information may include at least one of the following manners:

In a first possible implementation manner, to enable the server to subsequently determine address information corresponding to the geographical position according to a use condition of address information historically used by each user, after receiving the target address information sent by the terminal, the server can use the received target address information to update the address information in the address database. For example, the step that the server updates the address database according to the received target address information may include:

First, the server determines whether the target address information exists in the address database.

After receiving the address information sent by the terminal, the server may first determine whether the target address information exists in the address database.

Second, if a determination result is yes, add 1 to the number of times that the target address information is used.

If a determination result of the server is yes, it indicates that a user has already used the address information previously, and to obtain the accumulated number of times that the address information is used, the server can add 1 to the number of times that the target address information is used.

Third, if a determination result is no and the type of the target address information is a school, company or hospital, add the target address information in the address database.

When the type of the address information is a public site such as a school, company or hospital, these pieces of address information can be shared by a plurality of users. Therefore, when a determination result of the server is no and the type of the target address information is a school, company or hospital, to make it convenient for a subsequent user to directly obtain the address information, the server can add the target address information in the address database.

It should be noted that, when the type of the address information is a private site such as a residence, the address information that every family needs to use is different, that is, these pieces of information are very unlikely to be used by other users subsequently. Therefore, to reduce the space occupied by the address database in the server and increase the space utilization of the server, the server is allowed not to add this type of address information in the address database. Definitely, in a practical implementation, when detecting that the address database does not include the target address information, the server adds the target address information in the address database rather than to consider the type of the address information, which is not limited in this embodiment.

In a second possible implementation manner, to make it convenient for a user to query for address information historically used by the user later or select one piece of address information from the historically used address information as the address information that the user needs to use, after receiving the target address information, the server can further update a personal database corresponding to a user account that the terminal uses when accessing the target page according to the received target address information, and the specific steps may include:

Store the target address information in a personal database corresponding to a user account that the terminal uses when accessing the target page, so that subsequently each terminal that uses the user account can query for the target address information historically used by the user account.

Correspondingly, the server can further execute the following steps:

First, the server receives a query request sent by the terminal, where the query request is programmed to query for the target address information historically used by the user account used by the terminal.

The terminal can send the query request to the server, and correspondingly, the server can receive the query request sent by the terminal. The query request is programmed to query for the target address information historically used by the user account used by the terminal.

Second, the server queries the stored personal database corresponding to the user account for the target address information historically used by the user account.

After receiving the query request, the server can query the stored personal database corresponding to the user account for the target address information historically used by the user account.

Third, the server feeds back the found target address information to the terminal, so that the terminal receives the target address information that is fed back.

The server feeds back the found target address information to the terminal. Correspondingly, the terminal can receive the target address information fed back by the server. In a practical implementation, after receiving the target address information fed back by the server, the terminal can, in one aspect, enable the user to know which pieces of address information that the user has used, and in another aspect, select one piece of address information from the historically used target address information as the address information that needs to be used. This embodiment does not limit the use manner after the terminal has found the target address information.

Step 412. Set the address information as default address information corresponding to the user account that the terminal uses when accessing the target page.

To enable the user to use the address information used by the terminal the current time as the address information that the user needs to use every time later, the terminal can further set the address information as the default address information corresponding to the user account that the terminal uses when accessing the target page, so that when each terminal that uses the user account accesses another page having the same function as the target page, the terminal can directly input the default address information in an address input area of the other page. The default address information is directly input in an address input area of another target page in a subsequent jump to the other target page. The other page having the same function as the target page in this embodiment refers to an order confirmation page that the terminal jumps to when selecting shopping.

It should be further noted that Step 412 may be executed at any step after Step 409, and this embodiment only uses the execution at this time as an example, and the specific execution moment thereof is not limited.

Also, Step 408 to Step 412 are similar to Step 311 to Step 315 in the above example embodiment, and the more details may be referred to the above embodiment, which are no longer elaborated in this embodiment.

In conclusion, in the address information input method provided by this embodiment, an address acquisition request is sent to a server in a jump to a target page where an address needs to be input, and address information sent by the server is received, where the server receives the address acquisition request, acquires a geographical position of a terminal according to the address acquisition request, and determines the address information corresponding to the geographical position according to an address database, so that the received address information can be input automatically in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

Figure 8:
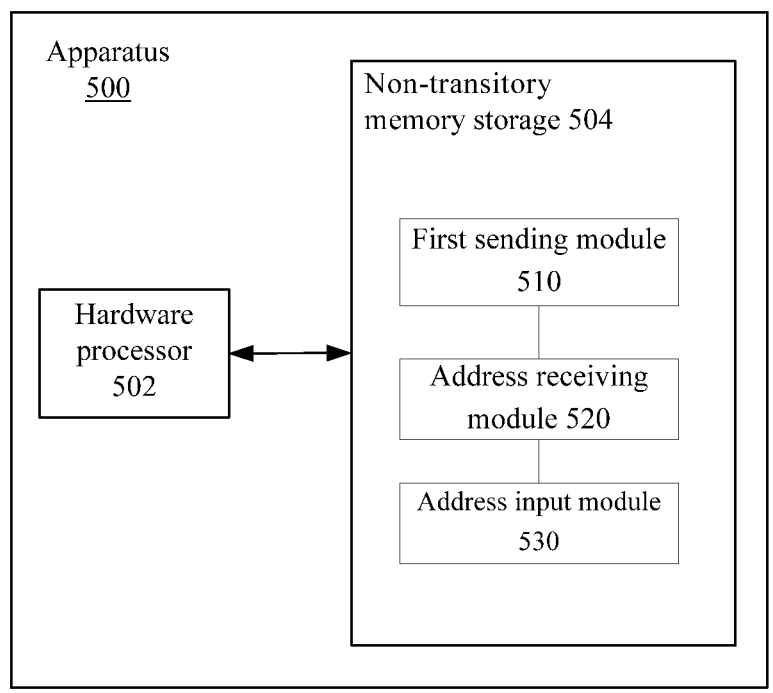
FIG. 8 is a structural block diagram of an address information input apparatus provided by an example embodiment of the present disclosure.

Referring to FIG. 8, FIG. 8 is a structural block diagram of an address information input apparatus 500 provided by an example embodiment of the present disclosure. The address information input apparatus 500 may be implemented as all or a part in a terminal through software, hardware or a combination of the two, and the address information input apparatus 500 may include a hardware processor 502 and a non-transitory storage medium 504. The non-transitory storage medium 504 includes: a first sending module 510, an address receiving module 520, and an address input module 530.

The first sending module 510 is programmed to send an address acquisition request to a server in a jump to a target page where an address needs to be input.

The address receiving module 520 is programmed to receive address information sent by the server, where the server receives the address acquisition request, acquires a geographical position of the terminal according to the address acquisition request, and determines the address information corresponding to the geographical position according to an address database.

The address input module 530 is programmed to input automatically the address information received by the address receiving module 520 in an address input area of the target page.

In conclusion, the address information input apparatus provided by this embodiment sends an address acquisition request to a server in a jump to a target page where an address needs to be input, and receives address information sent by the server, where the server receives the address acquisition request, acquires a geographical position of a terminal according to the address acquisition request, and determines the address information corresponding to the geographical position according to an address database, so that the received address information can be input automatically in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

Figure 9:
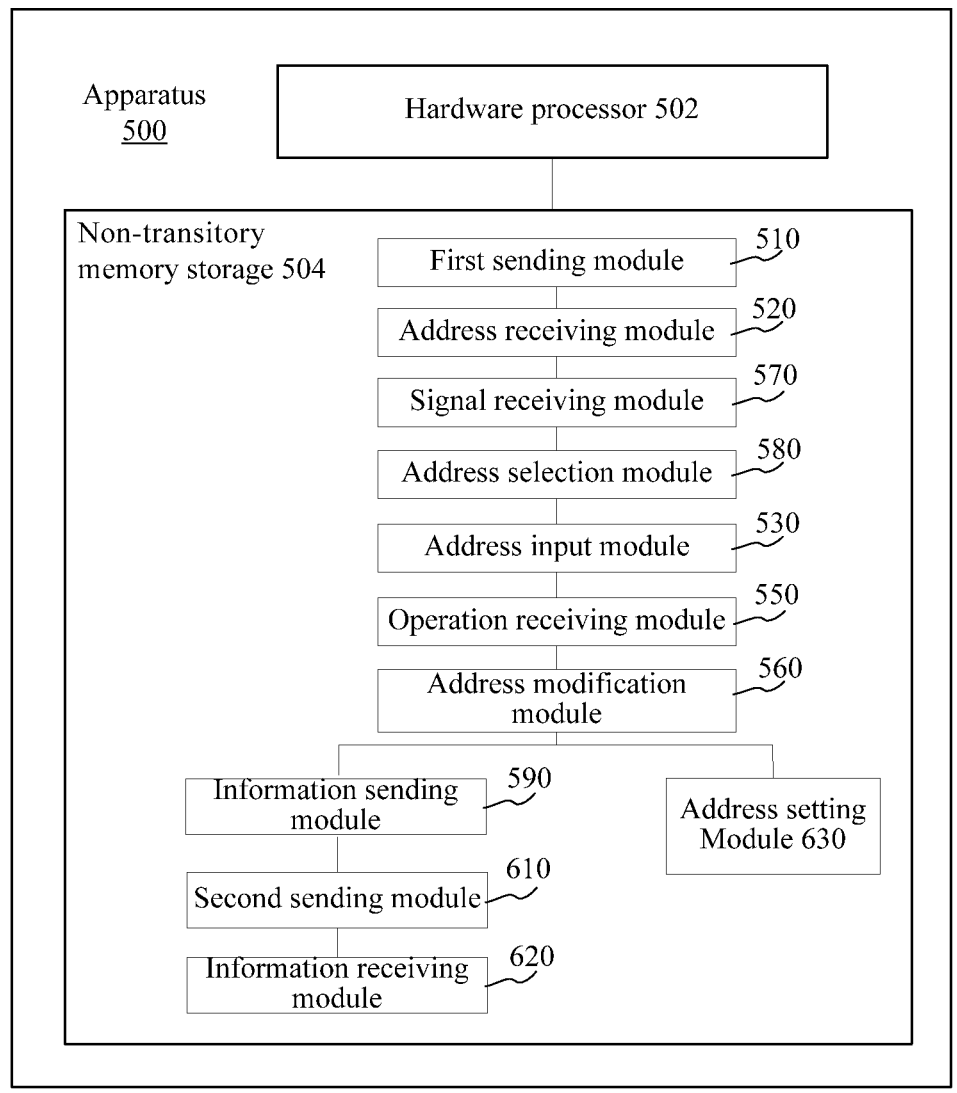
FIG. 9 is a structural block diagram of an address information input apparatus provided by an example embodiment of the present disclosure.

Referring to FIG. 9, FIG. 9 is a structural block diagram of an address information input apparatus 500 provided by an example embodiment of the present disclosure. The address information input apparatus may be implemented as all or a part in a terminal through software, hardware or a combination of the two. The address information input apparatus 500 may include a hardware processor 502 and a non-transitory storage medium 504. The non-transitory storage medium may include: a first sending module 510, an address receiving module 520, and an address input module 530.

The first sending module 510 is programmed to send an address acquisition request to a server in a jump to a target page where an address needs to be input.

The address receiving module 520 is programmed to receive address information sent by the server, where the server receives the address acquisition request, acquires a geographical position of the terminal according to the address acquisition request, and determines the address information corresponding to the geographical position according to an address database.

The address input module 530 is programmed to input automatically the address information received by the address receiving module 520 in an address input area of the target page.

Figure 10:
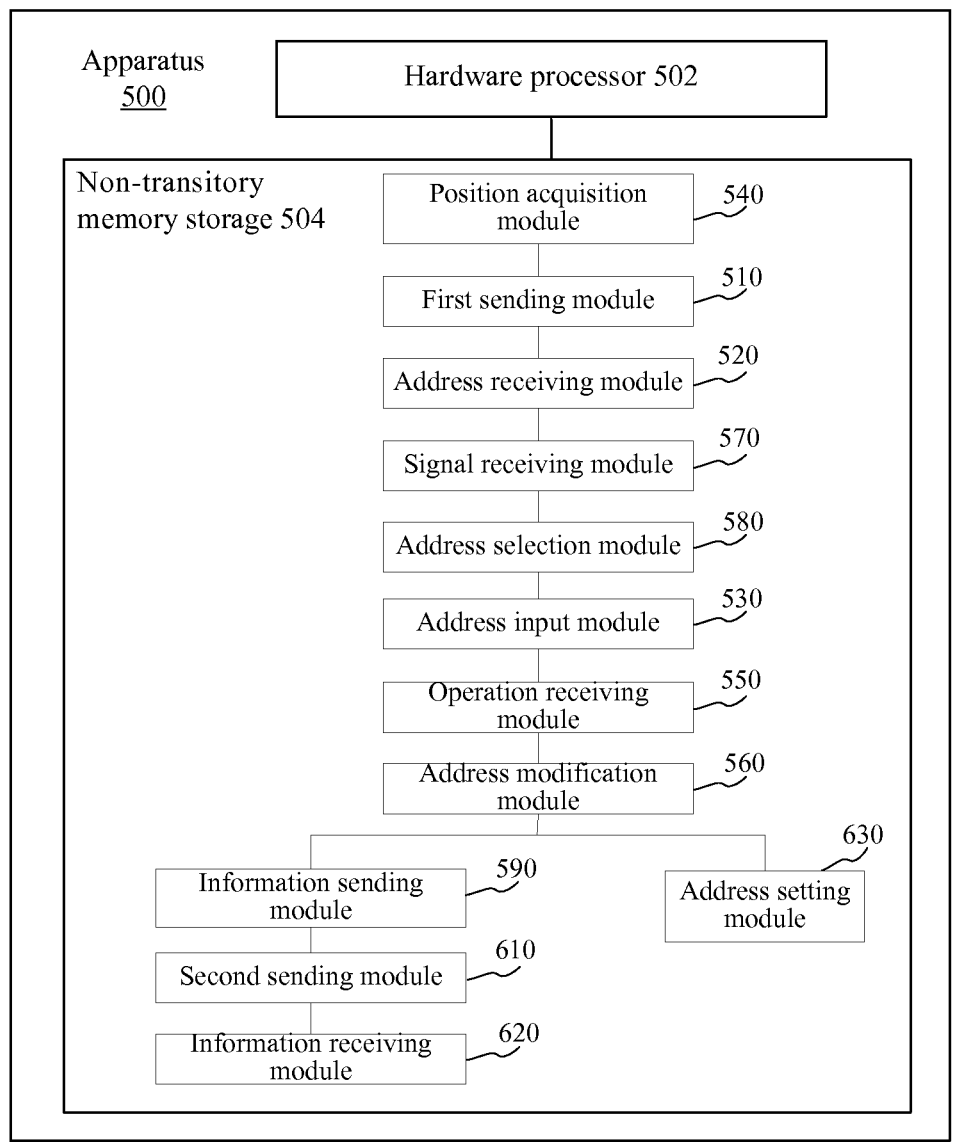
FIG. 10 is another structural block diagram of the address information input apparatus provided by an example embodiment of the present disclosure.

Referring to FIG. 10, in a first possible implementation manner of this embodiment, the apparatus 500 further includes: a position acquisition module 540.

The position acquisition module 540 is programmed to acquire the geographical position of the terminal in a preset positioning manner.

The first sending module 510 is programmed to send the address acquisition request including the geographical position acquired by the position acquisition module to the server, so that the server reads the geographical position in the address acquisition request.

In a second possible implementation manner of this embodiment:

The first sending module 510 is programmed to send a trigger request for requesting to acquire the address information of the terminal to the server, where the trigger request is programmed to trigger the server to position the terminal to acquire the geographical position of the terminal.

In a third possible implementation manner of this embodiment, the apparatus 500 further includes: an operation receiving module 550 and an address modification module 560.

The operation receiving module 550 is programmed to receive a modification operation for modifying the address information.

The address modification module 560 is programmed to modify the address information according to the modification operation received by the operation receiving module 550.

In a fourth possible implementation manner of this embodiment, the apparatus 500 further includes: a signal receiving module 570 and an address selection module 580.

The signal receiving module 570 is programmed to receive, when two or more pieces of the address information are received, a selection signal for selecting one piece of address information from the two or more pieces of address information.

The address selection module 580 is programmed to select one piece of address information according to the selection signal received by the signal receiving module 570.

The address input module 530 is programmed to input automatically the address information selected by the address selection module 580 in an address input area of the target page.

In a fifth possible implementation manner of this embodiment, the apparatus 500 further includes: an information sending module 590.

The information sending module 590 is programmed to send target address information to the server, where the target address information is address information eventually input in the address input area, so that the server receives the target address information, determines whether the target address information exists in the address database, when a determination result is yes, adds 1 to the number of times that the target address information is used, when a determination result is no and the type of the target address information is a school, company or hospital, adds the target address information in the address database; and/or, the server receives the target address information, and stores the target address information in a personal database corresponding to a user account that the terminal uses when accessing the target page, so as to enable each terminal that uses the user account to query for target address information historically used by the user account.

In a sixth possible implementation manner of this embodiment, the apparatus 500 further includes: a second sending module 610 and an information receiving module 620.

The second sending module 610 is programmed to send a query request to the server, where the query request is programmed to query the target address information historically used by the user account used by the terminal, so that the server receives the query request, queries the stored personal database corresponding to the user account used by the terminal for the target address information historically used by the user account, and feeds back the found target address information.

The information receiving module 620 is programmed to receive the target address information fed back by the server.

In a seventh possible implementation manner of this embodiment, the apparatus 500 further includes: an address setting module 630.

The address setting module 630 is programmed to set the address information as default address information corresponding to the user account that the terminal uses when accessing the target page, where the default address information is directly input in an address input area of another target page in a subsequent jump to the other target page.

In conclusion, the address information input apparatus provided by this embodiment sends an address acquisition request to a server in a jump to a target page where an address needs to be input, and receives address information sent by the server, where the server receives the address acquisition request, acquires a geographical position of a terminal according to the address acquisition request, and determines the address information corresponding to the geographical position according to an address database, so that the received address information can be input automatically in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

Figure 11:
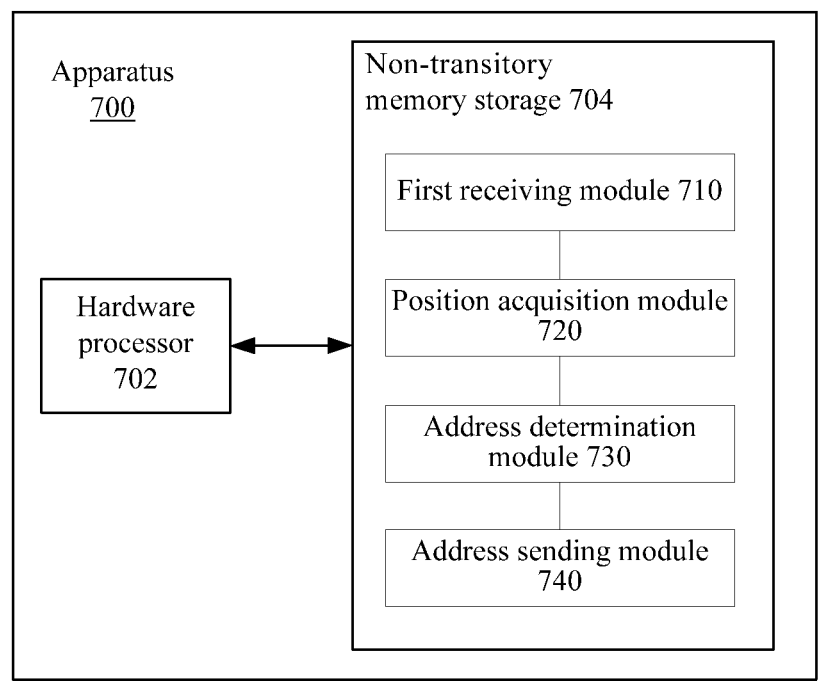
FIG. 11 is a structural block diagram of an address information acquisition apparatus provided by an example embodiment of the present disclosure.

Referring to FIG. 11, FIG. 11 is a structural block diagram of an address information acquisition apparatus 700 provided by an example embodiment of the present disclosure. The address information acquisition apparatus 700 may be implemented as all or a part in a server through software, hardware or a combination of the two. The address information acquisition apparatus 700 may include: a hardware processor 702 and a non-transitory storage medium 704. The non-transitory storage medium 704 includes: a first receiving module 710, a position acquisition module 720, an address determination module 730, and an address sending module 740.

The first receiving module 710 is programmed to receive an address acquisition request sent by a terminal, where the address acquisition request includes a request sent by the terminal in a jump to a target page where an address needs to be input.

The position acquisition module 720 is programmed to acquire a geographical position of the terminal according to the address acquisition request received by the first receiving module 710.

The address determination module 730 is programmed to determine address information corresponding to the geographical position acquired by the position acquisition module 720 according to an address database.

The address sending module 740 is programmed to send the address information determined by the address determination module 730 to the terminal, where the address information is automatically input in an address input area of the target page by the terminal.

In conclusion, the address information acquisition apparatus 700 provided by this embodiment receives an address acquisition request sent by a terminal, where the address acquisition request is a request that the terminal sends when opening a target page where an address needs to be input, acquires a geographical position of the terminal according to the address acquisition request, and determines address information corresponding to the geographical position according to an address database, and sends the determined address information to the terminal, so that terminal inputs automatically the address information in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

Figure 12:
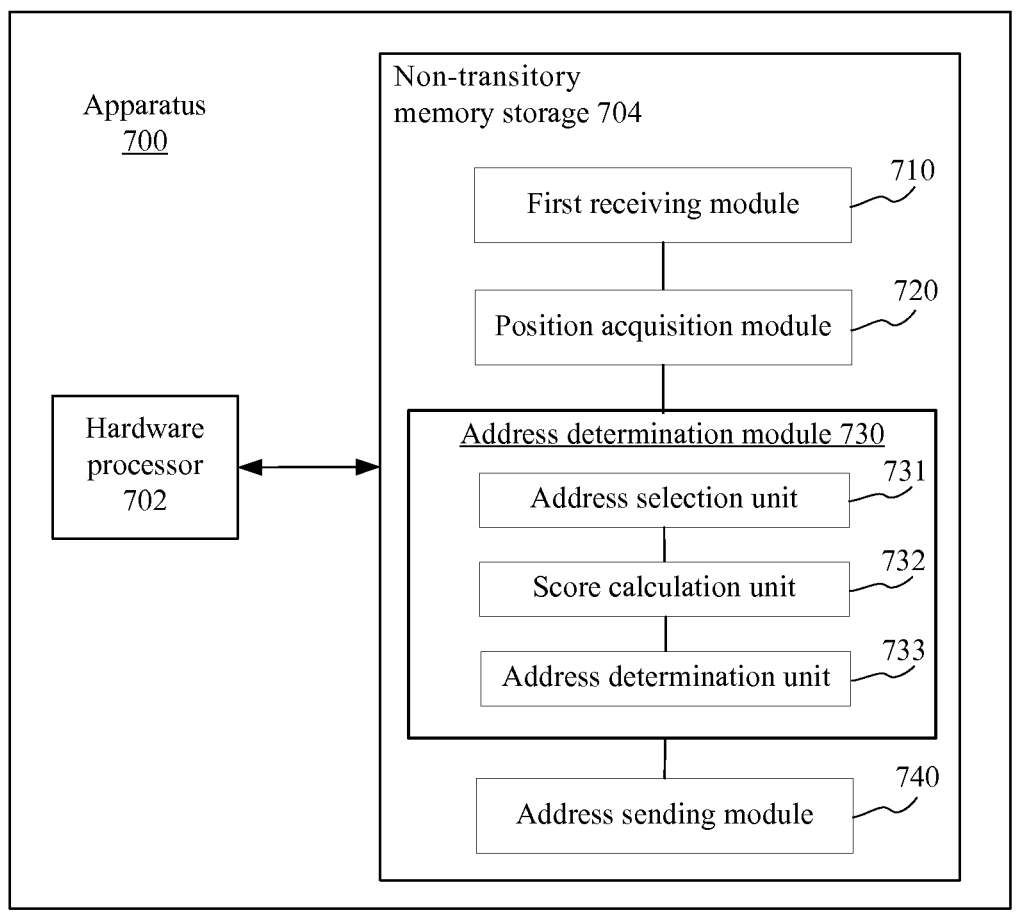
FIG. 12 is a structural block diagram of an address information acquisition apparatus provided by an example embodiment of the present disclosure.

Referring to FIG. 12, FIG. 12 is a structural block diagram of an address information acquisition apparatus 700 provided by an example embodiment of the present disclosure. The address information acquisition apparatus 700 may be implemented as all or a part in a server through software, hardware or a combination of the two. The address information acquisition apparatus 700 may include: a first receiving module 710, a position acquisition module 720, an address determination module 730, and an address sending module 740.

The first receiving module 710 is programmed to receive an address acquisition request sent by a terminal, where the address acquisition request includes a request sent by the terminal in a jump to a target page where an address needs to be input.

The position acquisition module 720 is programmed to acquire a geographical position of the terminal according to the address acquisition request received by the first receiving module 710.

The address determination module 730 is programmed to determine address information corresponding to the geographical position acquired by the position acquisition module 720 according to an address database.

The address sending module 740 is programmed to send the address information determined by the address determination module 730 to the terminal, where the address information is automatically input in an address input area of the target page by the terminal.

In a first possible implementation manner of this embodiment:

The first receiving module 710 is programmed to receive the address acquisition request including the geographical position sent by the terminal, where the geographical position is information acquired by the terminal in a preset positioning manner.

The position acquisition module 720 is programmed to read the geographical position in the address acquisition request received by the first receiving module 710.

In a second possible implementation manner of this embodiment:

The first receiving module 710 is programmed to receive a trigger request for requesting to acquire the address information of the terminal sent by the terminal.

The position acquisition module 720 is programmed to position, after the first receiving module 710 receives the trigger request, the terminal to acquire the geographical position of the terminal.

In a third possible implementation manner of this embodiment, the address determination module 730 includes:

an address selection unit 731, programmed to select at least one piece of address information from the address database, where the distance between a position corresponding to each piece of address information in the at least one piece of address information and the geographical position is smaller than a preset threshold value;

a score calculation unit 732, programmed to calculate a score of each piece of address information selected by the address selection unit 731 according to a preset score item, where the preset score item includes at least one of the distance between the position corresponding to the address information and the geographical position, the number of times that the address information is historically used, the type of the address information, and an information perfection degree of the address information, and the type of the address information is a school, company, hospital, residence, park or mall; and an address determination unit 733, programmed to use address information of n highest scores among the scores calculated by the score calculation unit 732 as the address information corresponding to the geographical position, where n is a positive integer.

Figure 13:
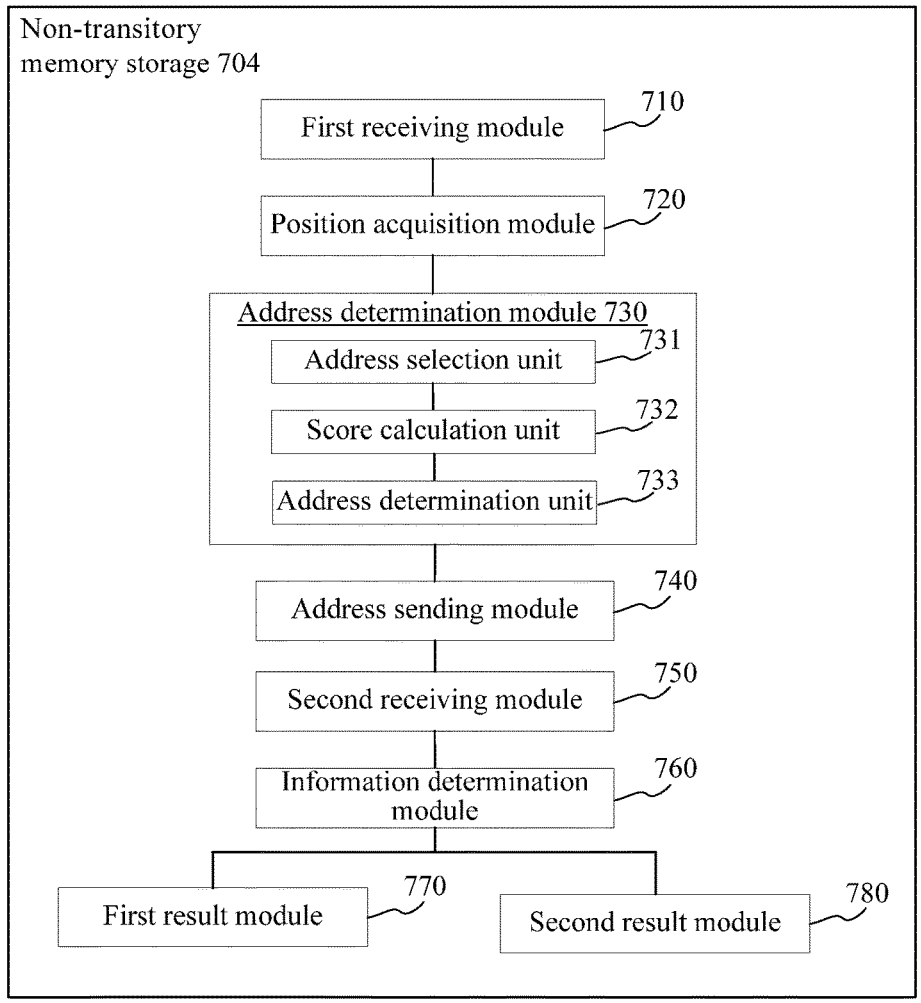
FIG. 13 is another structural block diagram of the address information acquisition apparatus provided by an example embodiment of the present disclosure.

Referring to FIG. 13, in a fourth possible implementation manner of this embodiment. The apparatus 700 includes a non-transitory storage medium 704. The non-transitory storage medium 704 is programmed to store modules and units disclosed above. For example, the non-transitory storage medium 704 stores the score calculation unit 732 that includes:

a first calculation subunit 732a, programmed to calculate, when the preset score item includes the distance between the position corresponding to the address information and the geographical position, according to the latitude and longitude of each piece of address information, the distance between the position corresponding to each piece of address information and the geographical position, and query for a first score corresponding to the calculated distance according to a first association relationship, where the first association relationship is a negative correlation relationship between the first score and the distance between the position corresponding to the address information and the geographical position;

a second calculation subunit 732b, programmed to calculate, when the preset score item includes the number of times that the address information is historically used, the number of times that each piece of address information is historically used, and query for a second score corresponding to the calculated number of times of historical use according to a second association relationship, where the second association relationship is a positive correlation relationship between the number of times that the address information is historically used and the second score;

a third calculation subunit 732c, programmed to query for, when the preset score item includes the type of the address information, according to a third association relationship, a third score corresponding to the type of each piece of address information, where the third association relationship is a relationship between the type of the address information and the third score;

a fourth calculation subunit 732d, programmed to calculate, when the preset score item includes an information perfection degree of the address information, an information perfection degree of each piece of address information, and query for a fourth score corresponding to the calculated information perfection degree according to a fourth association relationship, where the fourth association relationship is a positive correlation relationship between the information perfection degree of the address information and the fourth score; and a score calculation subunit 732e, programmed to calculate the score of each piece of address information according to the score of each preset score item and a weight corresponding to each preset score item.

Figure 14:
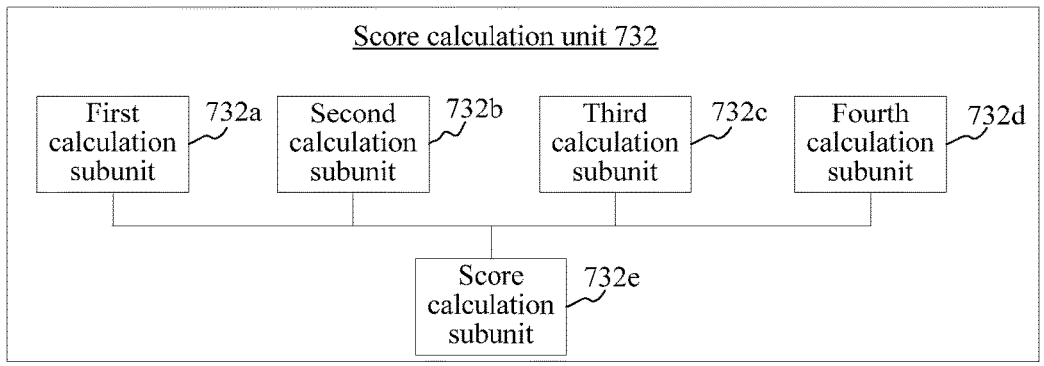
FIG. 14 is a structural block diagram of a score calculation unit provided by an example embodiment of the present disclosure.

Referring to FIG. 14, in a fifth possible implementation manner of this embodiment, the apparatus 700 further includes: a second receiving module 750, an information determination module 760, and a first result module 770.

The second receiving module 750 is programmed to receive target address information sent by the terminal, where the target address information is address information eventually input by the terminal in the address input area.

The information determination module 760 is programmed to detect whether the target address information received by the second receiving module 850 exists in the address database.

The first result module 770 is programmed to add one to the number of times that the target address information is used when a determination result of the information determination module 760 is yes.

In a sixth possible implementation manner of this embodiment, the apparatus further includes: a second result module 780. When a determination result of the information determination module 760 is no and the type of the target address information is a school, company, or hospital, the second result module 780 is programmed to add the target address information in the address database.

Figure 15:
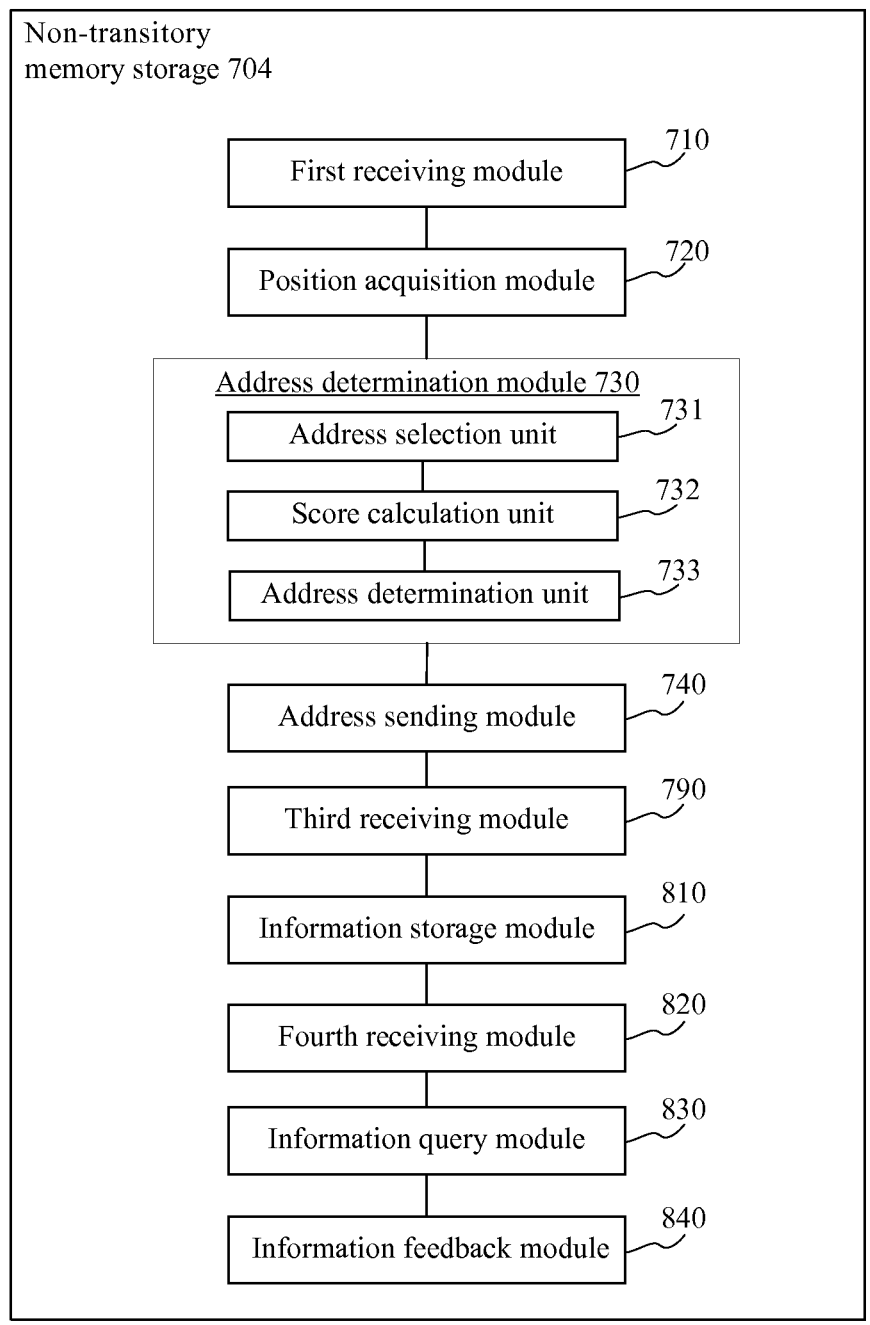
FIG. 15 is another structural block diagram of an address information acquisition apparatus provided by an example embodiment of the present disclosure.

Referring to FIG. 15, in a seventh possible implementation manner of this embodiment, the apparatus 700 further includes: a third receiving module 790 and an information storage module 710. The modules may be stored in the non-transitory storage medium 704.

The third receiving module 790 is programmed to receive target address information sent by the terminal, where the target address information is address information eventually input in the address input area.

The information storage module 810 is programmed to store the target address information received by the third receiving module 790 in a personal database corresponding to a user account that the terminal uses when accessing the target page.

In an eighth possible implementation manner of this embodiment, the apparatus further includes: a fourth receiving module 820, an information query module 830, and an information feedback module 840.

The fourth receiving module 820 is programmed to receive a query request sent by the terminal, where the query request is programmed to query for target address information historically used by the user account used by the terminal The information query module 830 is programmed to query the stored personal database corresponding to the user account for the target address information historically used by the user account.

The information feedback module 840 is programmed to feed back the target address information found by the information query module 730 to the terminal.

In conclusion, the address information acquisition apparatus provided by this embodiment receives an address acquisition request sent by a terminal, where the address acquisition request is a request that the terminal sends when opening a target page where an address needs to be input, acquires a geographical position of the terminal according to the address acquisition request, determine address information corresponding to the geographical position according to an address database, and sends the determined address information to the terminal, so that the terminal inputs automatically the address information in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

Figure 16:
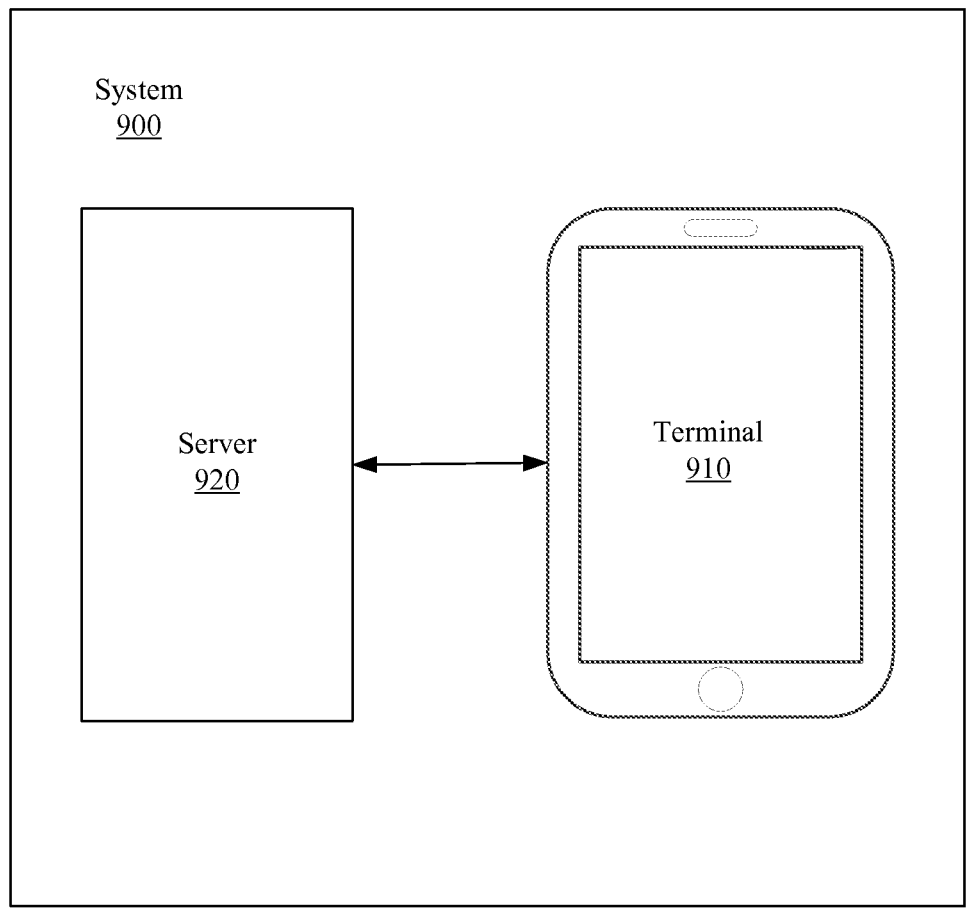
FIG. 16 shows an example embodiment of an address information input system.

FIG. 16 shows an example embodiment of an address information input system 900. The address information input system 900 may include a terminal 910 and a server 920. The system 900 may include multiple terminals and multiple servers in reality. The detailed description of the terminal 910 may be referred to the above example embodiments, and the detailed description of the server 920 may be referred to the above example embodiments, which are no longer elaborated in this embodiment.

In conclusion, the address information input system provided by this embodiment receives an address acquisition request sent by a terminal, where the address acquisition request is a request that the terminal sends when opening a target page where an address needs to be input, acquires a geographical position of the terminal according to the address acquisition request, determines address information corresponding to the geographical position according to an address database, and sends the determined address information to the terminal, so that the terminal inputs automatically the address information in an address input area of the target page. The problem that the efficiency of a terminal to acquire address information is quite low in the prior art is solved. The effect is achieved that a terminal can receive address information when opening a target page and input automatically the received address information in an address input area of the target page, thereby enhancing the efficiency of inputting address information.

It should be noted that for the address information input apparatus provided in the embodiments, when the address information acquisition apparatus inputs or acquires address information, the illustration is provided only by using an example of the foregoing division of functional modules. In a practical application, the foregoing functions may be distributed to different functional modules to accomplish according to needs, that is, the internal structure of the device is divided into different functional modules, so as to accomplish all or a part of the functions described above. In addition, for the address information input apparatus provided in the foregoing embodiments, the address information acquisition apparatus belongs to the same concept as the method embodiments of the address information input method and address information acquisition method, of which the specific implementation process may be referred to the method embodiments and are no longer elaborated here.

The sequence numbers of the above embodiments of the present disclosure are merely for the convenience of description, and do not imply the preference among the embodiments.

Those of ordinary skill in the art should understand that all or a part of the steps according to the embodiments may be implemented by hardware or also by a program instructing relevant hardware. The program may be stored in a computer readable storage medium. The storage medium may be a read-only memory, a magnetic disk, or an optical disc.

The foregoing only provides preferred embodiments of the present disclosure rather than to limit the present disclosure. Any modifications, equivalent replacements, and improvements made without departing from the spirit and principle of the present disclosure shall fall within the protection scope of the present disclosure.

The invention claimed is:

1. A method for inputting address information, comprising:
   receiving, on a terminal having a processor, a request to display a target page associated with a target page identifier;
   determining, in response to receipt of the request to display the target page, that the target page includes an address input area by determining the target page identifier is included in a plurality of previously stored target page identifiers for respective target pages that include corresponding address input areas;
   automatically sending an address acquisition request to a server in response to identification of the target page identifier in the plurality of previously stored target page identifiers;
   receiving address information sent by the server, the address information including an address corresponding to a geographical position of the terminal; and
   inputting automatically the address information in an address input area of the target page.

2. The method of claim 1, wherein before sending the address acquisition request to the server, the method comprises:
  acquiring the geographical position of the terminal in a preset positioning manner; and
  wherein sending the address acquisition request to the server comprises: sending the address acquisition request comprising the geographical position to the server to cause the server to read the geographical position in the address acquisition request and respond with the address information.

3. The method of claim 1, wherein sending the address acquisition request to the server comprises:
  sending a trigger request to acquire the address information from the server, wherein the trigger request comprises an instruction to trigger the server to position the terminal and acquire the geographical position of the terminal.

4. The method of claim 1, wherein after inputting automatically the address information in the address input area of the target page, the method further comprises:
  receiving a modification operation for modifying the address information; and modifying the address information according to the modification operation.

5. The method of claim 1, wherein the address information comprises a plurality of addresses corresponding to the geographical position of the terminal, wherein before inputting automatically the address information in the address input area of the target page, the method comprises:
  receiving a selection signal corresponding to one of the addresses; and
  selecting the one of the addresses in response to the selection signal, wherein inputting automatically the address information in the address input area of the target page comprises: inputting automatically the one of the addresses in the address input area of the target page.

6. The method of claim 1, further comprising:
  sending a query request to the server, wherein the query request comprises an instruction to query a personal database corresponding to a user account used by the terminal for target address information historically used by the user account, and an instruction to provide the target address information to the terminal; and
  receiving the target address information from the server.

7. The method of claim 1, wherein the target page comprises a first target page, the method further comprising:
  setting, in response to receipt of the address information from the server, the address information as default address information associated with a user account corresponding to the terminal; and
  inputting the default address information into an address input area of a second target page in response to a subsequent jump to the second target page.

8. A method for acquiring address information, comprising: receiving an address acquisition request sent by a terminal, wherein the address acquisition request comprises a request to input an address in a target page; acquiring a geographical position of the terminal according to the address acquisition request; determining address information corresponding to the geographical position according to an address database; and sending the determined address information to the terminal, wherein the address information is automatically input in an address input area of the target page by the terminal, wherein determining address information corresponding to the geographical position according to the address database comprises:
  selecting at least one piece of address information from the address database, wherein a distance between a position corresponding to each piece of address information in the at least one piece of address information and the geographical position is smaller than a preset threshold value; calculating a score of each selected piece of address information according to a predetermined score item, wherein the predetermined score item comprises at least one of the distance between the position corresponding to the address information and the geographical position, the number of times that the address information is historically used, the type of the address information, and an information perfection degree of the address information, and the type of the address information is a school, company, hospital, residence, park or mall; and using address information of n highest scores as the address information corresponding to the geographical position, wherein n is a positive integer,
  wherein calculating a score of each selected piece of address information according to the predetermined score item comprises: if the predetermined score item comprises the distance between the position corresponding to the address information and the geographical position, calculating, according to the latitude and longitude of each piece of address information, the distance between the position corresponding to each piece of address information and the geographical position, querying for a first score corresponding to the calculated distance according to a first association relationship, wherein the first association relationship is a negative correlation relationship between the first score and the distance between the position corresponding to the address information and the geographical position; if the predetermined score item comprises the number of times that the address information is historically used, calculating the number of times that each piece of address information is historically used, and querying for a second score corresponding to the calculated number of times of historical use according to a second association relationship, wherein the second association relationship is a positive correlation relationship between the number of times that the address information is historically used and the second score; if the predetermined score item comprises the type of the address information, querying for a third score corresponding to the type of each piece of address information according to a third association relationship, wherein the third association relationship is a relationship between the type of the address information and the third score; if the predetermined score item comprises an information perfection degree of the address information, calculating an information perfection degree of each piece of address information, querying for a fourth score corresponding to the calculated information perfection degree according to a fourth association relationship, wherein the fourth association relationship is a positive correlation relationship between the information perfection degree of the address information and the fourth score; and calculating the score of each piece of address information according to the score of each predetermined score item and a weight corresponding to each predetermined score item.

9. An apparatus comprising a processor and a non-transitory storage medium accessible to the processor, the non-transitory storage medium comprising a plurality of instructions executable by the processor, the instructions comprising:

instructions executable by the processor to receive a request to display a target page provided by a first server, the target page associated with a target page identifier;

instructions executable by the processor to identify the target page identifier included in a plurality of previously stored target page identifiers for respective target pages that include corresponding address input areas;

instructions executable by the processor to determine, in response to receipt of the request to display the target page and identification of the target page identifier included in the previously stored target page identifiers, that the target page includes an address input area;

instructions executable by the processor to send, in response to the target page identifier being included in the plurality of previously stored target page identifiers, an address acquisition request to a second server before the target page is displayed;

instructions executable by the processor to receive address information from the second server, the address information including an address corresponding to a geographical position of the apparatus;

instructions executable by the processor to display the target page; and instructions executable by the processor to automatically input the address information in an address input area of the target page in response to receipt of the address information.

10. The apparatus of claim 9, wherein the non-transitory storage medium further comprises:

instructions executable by the processor to acquire the geographical position of the apparatus according to a preset positioning manner; and instructions executable by the processor to include the geographical position of the apparatus in the address acquisition request.

11. The apparatus of claim 9, wherein the instructions executable by the processor to send the address acquisition request further comprise instructions executable by the processor to send a trigger request that causes the second server to acquire the geographical position of the apparatus from a source other than the apparatus, and communicate the geographical position of the apparatus to the apparatus.

12. The apparatus of claim 9, the non-transitory storage medium further comprising:

instructions executable by the processor to receive a modification operation for modifying the address information; and instructions executable by the processor to modify the address information according to the modification operation.

13. The apparatus of claim 9, wherein the address information comprises a plurality of pieces of address information, wherein the non-transitory storage medium further comprises:

instructions executable by the processor to receive a selection signal directed at a piece of address information displayed by the apparatus;

instructions executable by the processor to select the piece of address information in response to receipt of the selection signal; and instructions executable by the processor to automatically input the piece of address information in the address input area of the target page.

14. The apparatus of claim 9, wherein the non-transitory storage medium further comprises:

instructions executable by the processor to send a query request to the second server, wherein the query request comprises an instruction to query a personal database corresponding to a user account associated with the apparatus to identify target address information historically used by the user account, and provide the target address information to the apparatus; and instructions executable by the processor to receive the target address information provided by the second server.

* * * * *